(12) United States Patent
Kikuchi

(10) Patent No.: US 8,184,992 B2
(45) Date of Patent: May 22, 2012

(54) OPTICAL FIELD RECEIVER AND OPTICAL TRANSMISSION SYSTEM

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 12/439,705

(22) PCT Filed: Sep. 26, 2006

(86) PCT No.: PCT/JP2006/319021
§ 371 (c)(1),
(2), (4) Date: Mar. 3, 2009

(87) PCT Pub. No.: WO2008/038337
PCT Pub. Date: Apr. 3, 2008

(65) Prior Publication Data
US 2010/0021179 A1 Jan. 28, 2010

(51) Int. Cl.
*H04B 10/06* (2006.01)
(52) U.S. Cl. .................... 398/202; 398/208
(58) Field of Classification Search .................... None
See application file for complete search history.

(56) References Cited

U.S. PATENT DOCUMENTS

| | | | |
|---|---|---|---|
| 2004/0114939 A1* | 6/2004 | Taylor | 398/152 |
| 2005/0196176 A1* | 9/2005 | Sun et al. | 398/152 |
| 2007/0047964 A1* | 3/2007 | Ooi et al. | 398/147 |
| 2007/0127933 A1* | 6/2007 | Hoshida et al. | 398/202 |

FOREIGN PATENT DOCUMENTS

| | | |
|---|---|---|
| JP | 3-071729 | 3/1991 |
| JP | 2001-251250 | 9/2001 |
| WO | 2005/088876 | 9/2005 |
| WO | 2007/132503 | 11/2007 |

OTHER PUBLICATIONS

Griffin et al.; 10 Gb/s Optical Differential Quadrature Phase Shift Key (DQPSK) Transmission using GaAs/AlGaAs Integration; OFC2002, paper PD-FD6, 2003.
Sekine et al.; Proposal and Demonstration of 10-Gsymbol/sec 16-ary (40 Gbit/s) Optical Modulation/Demodulation Scheme; paper We3.4.5, ECOC 2004, 2004.
Taylor; Coherent detection method using DSP to demodulate signal and for subsequent equalisation of propagation impairments; paper We4.P.111, ECOC 2003, 2003.

(Continued)

*Primary Examiner* — Jessica Stultz
*Assistant Examiner* — Sean Hagan
(74) *Attorney, Agent, or Firm* — Mattingly & Malur, PC

(57) ABSTRACT

An optical field receiver comprises an optical brancher that branches a received optical multilevel signal into first and second optical signals; an optical delayed detector that performs delayed detection on the first optical signal by a delayed detector with a delay time of T/2 (where T is equal to a symbol time) and a phase difference of 90 degrees; a balanced optical receiver that converts the optical signal outputted from the first delay detector to an electric signal; and an optical intensity receiver that converts the second optical signal to an electric signal; and an electric field calculating part that generates, from the output signals of the first and second optical receivers, first and second reproduced signals indicative of the phase angle and amplitude value of the received symbol represented by the complex signal in each symbol time T.

20 Claims, 20 Drawing Sheets

BINARY PHASE MODULATION ( MODULATION FACTOR = $\pi/2$ )
OPTICAL TRANSMISSION SYSTEM OF THE INVENTION $E'(n) = r(n) \exp(\phi(n))$
$AM(n) = r^2(n)$
$dQ(n) = r(n)r(n-1)\sin(\Delta\phi)$
$\Delta\phi = \phi(n) - \phi(n-1)$
$y = \sin(\Delta\phi)$

OTHER PUBLICATIONS

Ellis et al.; Receiver-side electronic dispersion compensation using passive optical field detection for low 10Gbit/s 600 km-reach applications; Paper OTuE4, Optical Fiber Conference (OFC), 2006.

Kikuchi et al.; Study on Cross-Phase Modulation (XPM) Effect on Amplitude and Differentially Phase-Modulated Multilevel Signals in DWDM Transmission, IEEE Photonics Technology Letters, vol. 17, No. 7, Jul. 2005, pp. 1549-1551.

Sekine et al.; 40Gbit/s, 16-ary (4bit/symbol) optical modulation/demodulation scheme, Electronics Letters, vol. 41, No. 7, Mar. 31, 2005.

Sekine et al.; Hikari 16-chi Shinpuku Iso Hencho Hoshiki (16APSK) no Kento, IEICE Technical Report, Shadan Hojin the Institute of Electronics, Information and Communication Engineers, 0082005-8, Apr. 15, 2005, English Abstract, pp. 29-34.

Kikuchi et al.; Jiko Homodyne Kansho ni yoru Iso Hencho-Tachi Henchoko no. Denkai Hakei Kansokuho, 2006 Nen the Institute of Electronics, Information and Communication Engineers Sogo Taikai, Shadan Hojin the Institute of Electronics, Information and Communication Engineers, Tsushin 2-B-10-58, Mar. 8, 2006, p. 378.

* cited by examiner

FIG. 1A PRIOR ART
BINARY AMPLITUDE
SHIFT KEYING
(BASK)
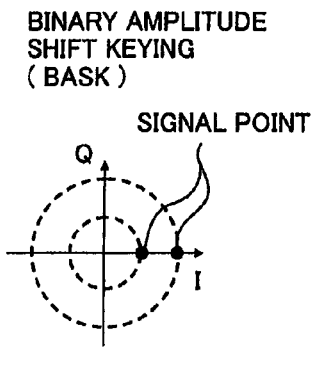
FIG. 1B PRIOR ART
QUARTERNARY PHASE
SHIFT KEYING
(QPSK)
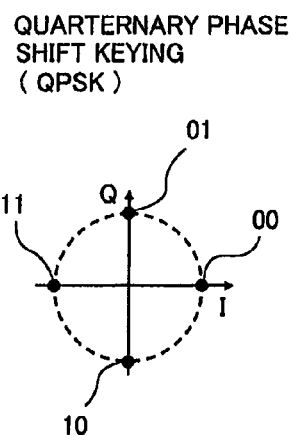
FIG. 1C PRIOR ART
16-LEVEL QUADRATURE
AMPLITUDE MODULATION
(16QAM)
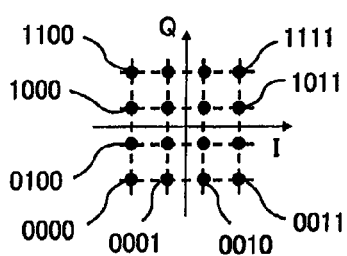
FIG. 1D PRIOR ART
16-LEVEL AMPLITUDE
AND PHASE MODULATION
(16APSK)
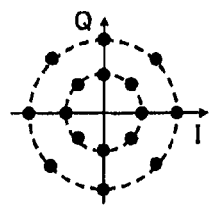
FIG. 1E PRIOR ART
DEFINITION OF AMPLITUDE
AND PHASE
SIGNAL POINT n

COHERENT OPTICAL FIELD
RECEIVING SYSTEM
( PRIOR ART )

INFLUENCE OF PHASE FLUCTUATION

8-LEVEL AMPLITUDE
AND PHASE MODULATION
( APSK )

OPTICAL MULTILEVEL SIGNAL RECEIVER
FOR RECEIVING 8-LEVEL ASPK SIGNAL
( PRIOR ART )

FIG. 4A

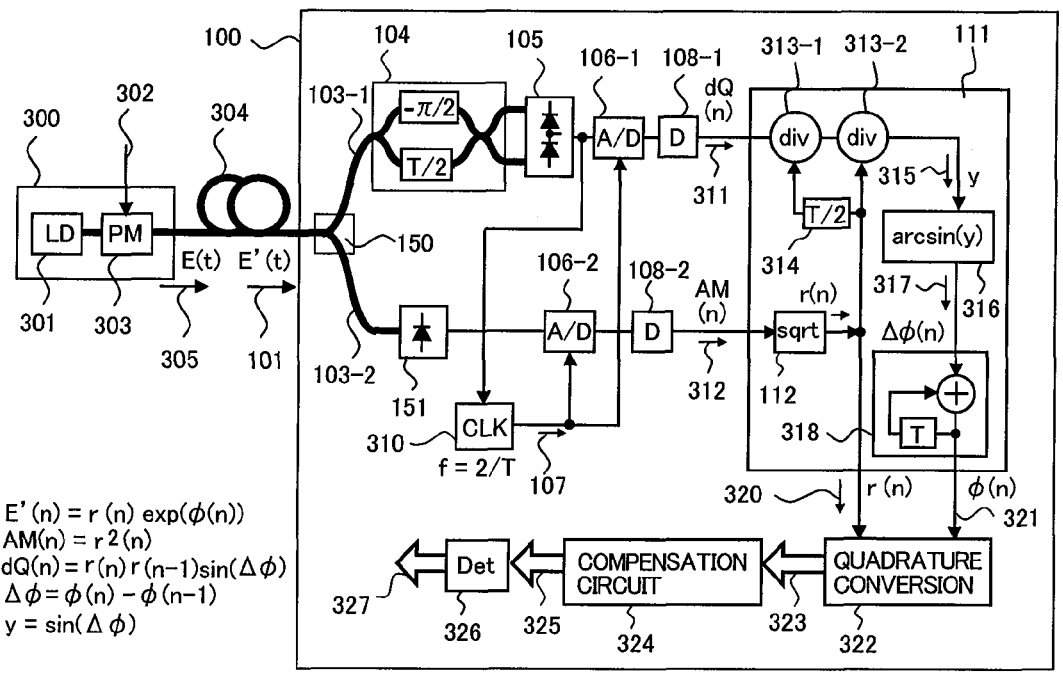

BINARY PHASE MODULATION (MODULATION FACTOR = $\pi/2$)
OPTICAL TRANSMISSION SYSTEM OF THE INVENTION $E'(n) = r(n)\exp(\phi(n))$
$AM(n) = r^2(n)$
$dQ(n) = r(n)r(n-1)\sin(\Delta\phi)$
$\Delta\phi = \phi(n) - \phi(n-1)$
$y = \sin(\Delta\phi)$

FIG. 4B

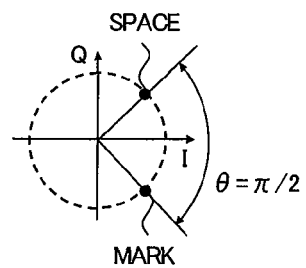

SIGNAL CONSTELLATION OF
BINARY PHASE MODULATION LIGHT
(MODULATION FACTOR = $\pi/2$)

FIG. 4C

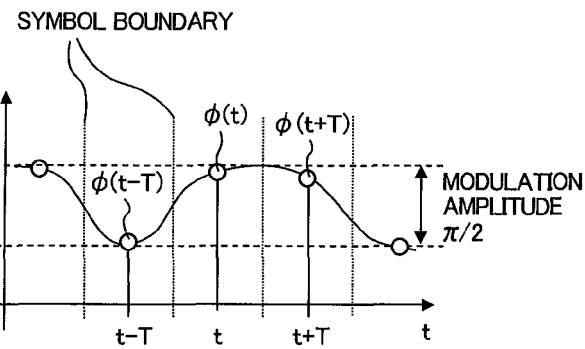

PHASE VARIATION IN BINARY
PHASE MODULATION LIGHT
(MODULATION FACTOR = $\pi/2$)

ELECTRICAL RECEIVED SIGNAL

RECONSTRUCTED FIELD SIGNAL

DELAYED DETECTION OUTPUT (DQ)
AND INTENSITY OUTPUT (AM)

SAMPLE NUMBER

WAVEFORM OF OPTICAL FIELD (IQ COMPONENT)
UNDERGONE RECONSTRUCTION AND OPTICAL
DISPERSION COMPENSATION AT ELECTRIC REGION

WAVEFORM OF INTENSITY
AFTER RECONSTRUCTION

OPTICAL FIELD AFTER
RECONSTRUCTION

WAVEFORM OF DELAYED
DETECTION OUTPUT
AFTER RECONSTRUCTION

WAVEFORM OF INTENSITY
AFTER OPTICAL DISPERSION
COMPENSATION

OPTICAL FIELD AFTER
OPTICAL DISPERSION
COMPENSATION

WAVEFORM OF DELAYED
DETECTION OUTPUT AFTER
OPTICAL DISPERSION
COMPENSATION

CHIRP-LESS BINARY INTENSITY MODULATION OPTICAL TRANSMISSION SYSTEM OF THE INVENTION

SIGNAL CONSTELLATION OF CHIRP-LESS
BINARY INTENSITY MODULATION LIGHT

SIGNAL CONSTELLATION OF CHIRP-LESS
BINARY INTENSITY MODULATION LIGHT
HAVING BEEN TRANSMITTED THROUGH FIBER
(10Gbit/s, SMF180km)

TRANSMISSION WAVEFORM OF BINARY
INTENSITY MODULATION LIGHT

RECEPTION WAVEFORM OF BINARY
INTENSITY MODULATION LIGHT

LIGHT INTENSITY OF BINARY INTENSITY MODULATION
LIGHT (A=1) AND QUANTITY OF PHASE ROTATION
WITHIN TIME PERIOD TD = 50PS AFTER
TRANSMITTED 180 KM

MINIMUM LIGHT INTENSITY AND QUANTITY OF
MAXIMUM PHASE ROTATION BETWEEN SAMPLES
OF BINARY INTENSITY MODULATION LIGHT (A=1)

EXAMPLE OF MULTI-LEVEL PHASE AND AMPLITUDE MODULATION LIGHT TRANSMISSION SYSTEM OF THE INVENTION

FIRST EXAMPLE OF SIGNAL CONSTELLATION OF FOUR-LEVEL PHASE AND AMPLITUDE MODULATION LIGHT

SECOND EXAMPLE OF SIGNAL CONSTELLATION OF FOUR-LEVEL PHASE AND AMPLITUDE MODULATION LIGHT

THIRD EXAMPLE OF SIGNAL CONSTELLATION OF FOUR-LEVEL PHASE AND AMPLITUDE MODULATION LIGHT

EXAMPLE OF SIGNAL CONSTELLATION OF BINARY DIFFERENTIAL PHASE MODULATION LIGHT

OPTICAL FIELD RECEIVER AND OPTICAL TRANSMISSION SYSTEM

TECHNICAL FIELD

The present invention relates to an optical information transmission technology, and more specifically, to an optical field receiver suitable for receiving an optical multilevel signal transmitted over an optical fiber, an optical multilevel signal receiver, and an optical transmission system.

BACKGROUND ART

In recent years, even though the quantity of information (transmission capacity) transmittable over one optical fiber continues to increase as the number of multiplexed wavelength channels increases and the modulation speed of an optical signal becomes faster and faster. The increase of the transmission capacity reaches a limit of approximately 10 T (Tera)bit/s. The main reason why it is difficult to increase the transmission capacity is that a wavelength bandwidth usable for the optical transmission reaches the maximum bandwidth of a wavelength bandwidth (a sum of C-band, L-band, and S-band corresponds to approximately 80 nm=10 THz) of an optical fiber amplifier. In order to further increase the transmission capacity of the optical fiber, a study was performed on a signal modulation scheme to increase the efficiency of spectral usage by packing as much as possible a number of optical signals in the limited spectrum.

In the world of wireless communication, the efficiency of spectral usage exceeds 10 by a multilevel modulation technology spread since the 1960s. As a result, high-efficiency transmission has been achieved. Since multilevel modulation has great prospects for the optical fiber transmission, many studies on the multilevel modulation have progressed from the past. For example, R. A. Griffin, et. al., "10 GB/s Optical Differential Quadrature Phase Shift Key (DQPSK) Transmission using GaAs/AlGaAs Integration," OFC2002, paper PD-FD6, 2003 (Non-Patent Document 1) discloses QPSK (Quadrature Phase Shift Keying) that performs quaternary phase shift keying and Kenro Sekine, Nobuhiko Kikuchi, Shinya Sasaki, Shigenori Hayase and Chie Hasegawa, "Proposal and Demonstration of 10-Gsymbol/sec 16-ary (40 Gbit/s) Optical Modulation/Demodulation Scheme", paper We3.4.5, ECOC 2004, 2004 (Non-Patent Document 2) discloses 16-level amplitude and phase modulation that is a combination of quaternary amplitude shift keying and quaternary phase shift keying.

In FIG. 1, (A) to (D) show features of various modulation schemes in the prior art applicable to optical transmission, wherein a signal point (complex representation of the optical field at the decision timing) of optical modulation is plotted on a complex plane (IQ plane).

FIG. 1(A) shows a binary amplitude shift keying (BASK) that is widely being used. The BASK transmits 1-bit signal by only using the amplitude (high and low) while not using a phase.

FIG. 1(B) shows a quaternary phase shift keying (QPSK) that transmits 2-bit signal (11, 10, 01, 00) at one symbol by using a quaternary phase angle (0, $\pi/2$, $\pi$, $-\pi/2$).

FIG. 1(C) shows 16-level quadrature amplitude modulation (16QAM) widely being used in wireless communication. The 16QAM, which has signal points arranged in a grid shape, can transmit 4-bit signal at 1 symbol.

In the example shown, a value of the upper 2 bits (11xx, 10xx, 01xx, 00xx) is represented on a Q-axis coordinate and a value of the lower 2 bits (xx11, xx10, xx01, xx00) is represented on an I-axis coordinate. Since the arrangement of the signal points makes a signal point distance large, it has been known that receiver sensitivity is high. However, an implementation example in a field of the optical communication has not yet been reported.

FIG. 1(D) shows a 16-level amplitude and phase modulation (16APSK) where signal points of a binary amplitude shift keying and signal points of a 8-level phase shift keying are arranged in a concentric circular shape and FIG. 1(E) shows a relationship between the amplitude and phase.

As described above, although various arrangements of the signal points of the multilevel signal are reviewed from the past, the receiver becomes complicated as the number of multilevel increases. Further, if the number of multilevel increases, an inter-symbol interference in optical delayed detection for demodulating phase components increases, resulting in a problem that characteristics, such as receiver sensitivity, are rapidly degraded.

On the other hand, in order to increase the optical transmission capacity, a scheme that increases the modulation speed of each wavelength (channel) to about 10 Gbit/s to 40 Gbit/s has been studied. If the modulation speed is increased as described above, however, signal quality is significantly degraded due to the chromatic dispersion in the optical fiber or fiber non-linear effects, such as self-phase modulation. In the case of the optical transmission, the optical transmission distance is rapidly decreased as 1/(signal bit rate)2 due to the influence of the chromatic dispersion. For this reason, in the optical transmission of 10 Gbit/s or more, an optical signal receiving end or an optical repeater should have optical dispersion compensators for compensating the chromatic dispersion in a transmission line. For example, in the optical transmission of 40 Gbit/s, since tolerance against the chromatic dispersion is no more than 5 km for a standard single-mode fiber, an adaptive compensation technology, which automatically controls a tunable chromatic dispersion compensator disposed in the optical signal receiving end so as to minimize the degradation of the signal quality, has been studied.

However, the tunable chromatic dispersion compensator has many problems to be solved, such as the size, complexity, cost, control speed, and the like of the device. In recent years, a configuration that disposes an electrical adaptive equalizer, such as a feed-forward equalizer (FEE) or a decision-feedback equalizer (DFE), in an electrical circuit of the optical signal receiver or an electric stage compensation technology that estimates a receiving symbol using a most likelihood sequence estimator (MLSE) has been studied. However, the chromatic dispersion compensation in the electric stage according to the prior art is incomplete because only an eye opening of a received optical waveform is enlarged. For this reason, the compensation effect is still not sufficient because it can effectively expand the chromatic dispersion tolerance of the receiver to 1.5 to 2 times, for example, and extend the transmission distance of 40 Gbit/s signals to just 10 km in the standard optical fiber transmission.

As one of the prior arts that can solve the above-mentioned problems, for example, there is a coherent optical field receiving system that is disclosed in M. G. Taylor, "Coherent Detection Method Using DSP to Demodulate Signal and for Subsequent Equalization of Propagation Impairments," paper We4.P.111, ECOC 2003, 2003 (Non-Patent Document 3). In the coherent optical field receiving system, as shown in FIG. 2(A), the optical multilevel signal 123 transmitted over the fiber link is split into horizontal (P) polarization component 133 and vertical (S) polarization component 134 by means of a polarization splitter 131 and then input to coherent optical field receivers 135-1 and 135-2, respectively.

The coherent optical field receiving system should have a local laser 130 having approximately the same wavelength as a transmitting laser. An output light (local light) 132 from the laser 130 is split into two local lights 132-1 and 132-2 by an optical splitter 102 and then input to the coherent optical field receivers 135-1 and 135-2, respectively.

The coherent optical field receiver 135-1 includes an optical phase diversity circuit 136 and a digital signal processor 141. The optical phase diversity circuit 136 generates an I (in-phase) component output light 137 and a Q (quadrature-phase) component output light 138 from a local light 132-1 and a P polarization component 133 of the input optical multilevel signal. The I (in-phase) component output light 137 is in-phase component between the local light and the optical multilevel signal. The Q (quadrature-phase) component output light 138 is quadrature-phase component between the local light and the optical multilevel signal. The I component output light 137 is supplied to a balanced optical receiver 105-1 and the Q component output light 138 is supplied to a balanced optical receiver 105-2. Analog electric signals output from the balanced optical receivers 105-1 and 105-2 are time-sampled by A/D converters 106-1 and 106-2, respectively, and then converted into digital signals.

In the following description, as shown in FIG. 1(E), the optical field of a received signal is defined as $r(n)\exp(\phi(n))$ and the optical field of the local lights 132-1 and 132-2 is marked by $\exp(-\theta(n))$. Here, r represents the amplitude of the optical field, $\phi$ represents the phase of the optical field, and n represents sampling timing and it is assumed that the amplitude of the local light 132 is a constant value "1". Further, $\theta(n)$ represents phase fluctuation which is generated by phase noise inherently included in the laser or by the difference of optical frequency between the local light and the signal light. Although the transmitting laser of a transmitter side also has the phase noise, the phase noise is disregarded for simplification in the following explanation.

Each of the balanced optical receivers 105-1 and 105-2 performs homodyne detection of the input optical multilevel signal with the local light and outputs the in-phase component and the quadrature-phase component of the optical field of the input optical multilevel signal on the basis of the local light. As a result, the output signal 140-1 of the A/D converter 106-1 becomes $I'(n)=r(n)\cos(\phi'(n))$ and the output signal 140-2 of the A/D converter 106-2 becomes $Q'(n)=r(n)\sin(\phi'(n))$. For simplification, it is assumed here that $\phi'(n)=\phi(n)+\theta(n)$ and all the constants, such as conversion efficiency and the like, are "1".

If the phase fluctuation $\theta(n)$ is disregarded, $\phi'(n)=\phi(n)$. As a result, in the case of using the coherent optical field receiver, because all of the information (I and Q components in this case), which represents the optical field $r(n)\exp(\phi(n))$, is directly and simply obtained from the received optical multilevel signal 123, optical multilevel signal receiving should be possible. However, the influence of phase fluctuation $\theta(n)$ of the local light 132 can not actually be disregarded.

It is assumed, for example, that the received optical multilevel signal is multilevel-modulated in the 16-level quadrature amplitude modulation (16QAM) as shown in FIG. 1(C). When the phase fluctuation $\theta(n)$ occurs, the signal constellation of the received signal rotates by $\theta(n)$ from an ideal position as equivalently shown in FIG. 2(B). Consequently, it becomes unable to decide which symbol (signal point) is transmitted based on the foregoing I'(n) and Q'(n).

The digital signal processor 141 detects the slow rotation components (~several 100 MHz) of the signal point from the output signals of the A/D converters 106-1 and 106-2, eliminates the rotation components from the output signals of the A/D converters, assuming the rotation components as the phase fluctuation $\theta(n)$, by signal processing, and outputs to a symbol decision circuit 143 output signals 142-1 and 142-2 that represents the correct in-phase component $I(n)=r(n)\cos(\phi(n))$ and quadrature-phase component $Q(n)=r(n)\sin(\phi(n))$.

The balanced optical receiver 105-2 performs the same operation as the balanced optical receiver 105-1, such that it outputs the correct in-phase component $I(n)=r(n)\cos(\phi(n))$ and quadrature-phase component $Q(n)=r(n)\sin(\phi(n))$ as the output signals 142-3 and 142-4. The symbol decision circuit 143 judges with high accuracy which symbol is transmitted by comparing the I and Q components output from each digital signal processor 141 with the signal constellation shown in FIG. 1C and output a reconstructed multilevel digital signal 144.

By using the foregoing coherent optical field receiver, it is able to generate all the field information required to decide the multilevel signal by compensating the degradation of the signal due to chromatic dispersion, etc., by the signal processing. Accordingly, in principle, the coherent optical field receiver can receive the complex multilevel signal. Further, the coherent optical field receiver has advantages in that linear degradation due to chromatic dispersion, etc., can be perfectly compensated logically by performing a correction processing on the input signal in accordance with an inverse function of a transfer function of the fiber link by the digital signal processor 141, and there are no restrictions on the compensation quantity. However, since the small and high-speed digital signal processor 141 having signal processing performance of 10 Gbit/s or more has not yet launched onto the market, the foregoing digital processing type coherent optical field receiver is still at the stage where offline processing is performed with a computer on the electric signals 140-1 and 1402-2 obtained by using high-speed A/D converters to verifies the results.

Meanwhile, FIG. 3(B) shows a configuration of the optical multilevel signal receiver for receiving the amplitude and phase modulation light, as disclosed by Non-Patent Document 2. FIG. 3(A) shows an example of an 8-level amplitude and phase modulation light (8APSK) where 8 signal points having quaternary phase and binary amplitude are arranged on a concentric circle. In the optical modulation where the phase components are equidistantly split like 8APSK signals, a differential coding is generally used for modulating the phase components. In the present example, each symbol transmits 3-bit information by correlating each symbol to a binary value amplitude and a quaternary value phase in which phase difference with its just previous symbol is any one of 0, $\pi/2$, $\pi$, $-\pi/2$.

The optical multilevel signal receiver, which receives the 8APSK signal, uses an incoherent scheme that does not detect the optical field and as shown in FIG. 3(B), an input optical APSK signal 124 is branched into 3 optical signals by an optical branching circuit 150.

Among them, two optical signals are input to optical delayed detectors 104-1 and 104-2 and the remaining one optical signal is input to an optical intensity receiver 151. Each of the optical delayed detectors 104-1 and 104-2 includes a first optical path that generates a delay of a symbol time T to the input signal and a second optical path that has a $-\pi/4$ optical phase shifter or a $+\pi/4$ optical phase shifter and converts the phase modulation components into the optical intensity signals by interfering a state (symbol) of a received optical signal with a symbol received previously by time T.

The intensity of light output from the optical delayed detector 104-1 having the +π/4 optical phase shifter is large when the phase difference between a received symbol and a symbol just before the symbol is 0 or +π/2 and is small when the phase difference between a received symbol and a symbol just before the symbol is −π/2 or π. The output light of the optical delayed detector 104-1 is received by the balanced optical receiver 105-1 and the output of the balanced optical receiver 105-1 is binary-decided by a binary decision circuit 152-1, making it possible to obtain a binary reconstructed digital signal 153-2 corresponding to 1 bit.

The intensity of light output from the optical delayed detector 104-2 having the −π/4 optical phase shifter is large when the phase difference between a received symbol and a symbol just before the symbol is 0 or −π/2 and is small when the phase difference between a received symbol and a symbol just before the symbol is π/2 or π. The output light of the optical delayed detector 104-2 is input to a binary decision circuit 152-2 through the balanced optical receiver 105-2, such that a binary reconstructed digital signal 153-2 corresponding to another 1 bit included in the phase component is reconstructed.

The optical intensity receiver 151 converts the optical intensity (a square of optical field amplitude) of the received signal into the electric signal. The output of the optical intensity receiver 151 is decided by the binary decision circuit 152-3, such that a binary reconstructed digital signal 153-3 corresponding to 1 bit included in the optical amplitude component is reconstructed. Since the optical multilevel signal receiver uses the optical delayed detector, there are advantages in that the optical multilevel signal receiver reduces the influence of the phase fluctuation θ(n) and polarization dependency and does not require the local laser, or the like. Also, the optical multilevel signal receiver is able to receive the APSK signal, up to 16 levels.

Further, FIG. 1 of "A. D. Ellis etc. "Receiver-side Electronic Dispersion Compensation using Passive Optical Field Detection for Low Cost 10 Gbit/s 600 km Reach Applications", Paper OTuE4, Optical Fiber Conference (OFC) 2006 (Non-Patent Document 4) shows a configuration of an optical transmission system that transmits and receives binary intensity modulation light.

A low cost transmitter shown in FIG. 1 here externally modulates an optical signal output from a DFB laser with an information signal of 10 Gbit/s (a bit width of 100 ps) by a Mach-Zehnder type optical intensity modulator (MZM) or an electro absorptive optical modulator (EAM) and outputs the modulated optical signal to an optical fiber link. The modulation light transmitted by the optical fiber link is filtered by a narrowband optical filter and then received by an optical receiver composed of four parts of "A" to "D". The optical receiver has an effect of electrically compensating dispersion by obtaining an optical intensity (AM component) waveform and an optical frequency change (FM component) waveform and synthesizing them in the receiver.

The part "A" of the receiver comprises an asymmetrical Mach-Zehnder type optical interferometer with a delay amount of T=5 ps and two photo-detectors (output voltage V1 and V2) coupled to two output ports of the optical interferometer. The optical interferometer has a passing characteristic periodical at an optical frequency period of 200 GHz (=1/T) and serves as an optical frequency discriminator by setting the phase of the interferometer to 90°. For this reason, it is able to obtain an intensity waveform (AM waveform VA) of the received light at the part "B" by operating the sum component (V1+V2) of the output signals from two photodetectors.

On the other hand, a frequency waveform (FM waveform: VF) can be obtained by dividing the operation result of difference component (V1−V2) by an intensity waveform VA. The part "C" reconstructs pseudo optical field waveform in the receiver by intensity-modulating an electric sine wave signal of an intermediate frequency F (F>10 GHz) obtained from a micro wave oscillator with the AM waveform VA by using an AM modulator and modulating it with a FM waveform VF by using an FM modulator. Thereafter, the obtained electric signal of intermediate frequency passes through a microwave dispersive transmission line having dispersion characteristics opposite to that of the optical transmission line in order to compensate for waveform distortion caused by the dispersion (dispersion compensation) and is received by performing square detection.

The publication merely proposes the principle and does not completely verify that such a configuration is realizable actually. However, according to the proposal, it may be possible to compensate for the wavelength dispersion of the optical signal degraded by the chromatic dispersion.

Non-Patent Document 1:
R. A. Griffin, et. al., "10 Gb/s Optical Differential Quadrature Phase Shift Key (DQPSK) Transmission using GaAs/AlGaAs Integration," OFC2002, paper PD-FD6, 2003

Non-Patent Document 2:
Kenro Sekine, Nobuhiko Kikuchi, Shinya Sasaki, Shigenori Hayase and Chie Hasegawa, "Proposal and Demonstration of 10-Gsymbol/sec 16-ary (40 Gbit/s) Optical Modulation/Demodulation Scheme," paper We3.4.5, ECOC Non-Patent Document 3:
M. G. Taylor, "Coherent Detection Method Using DSP to Demodulate Signal and for Subsequent Equalization of Propagation Impairments," paper We4.P.111, ECOC 2003, 2003

Non-Patent Document 4:
A. D. Ellis etc, "Receiver-side Electronic Dispersion Compensation Using Passive Optical Field Detection for Low Cost 10 Gbit/s 600 km Reach Applications", Paper OTuE4, Optical Fiber Conference (OFC) 2006

DISCLOSURE OF THE INVENTION

Problems to be Solved by the Invention

It is an object of the present invention to provide an optical field receiver and an optical multilevel signal receiver that are practical and simple in terms of structure, without polarization dependency and a local laser.

In the optical fiber transmission, it is known that the state of polarization of transmission optical signal largely fluctuates with the passage of time. In principle, the coherent optical field receiver described in FIG. 2 is dependent on polarization. If the above described P polarization components loose the signal due to the fluctuation in the polarization, the coherent optical field receiver 135-1 is in a disable state. Therefore, the coherent optical field receiving system shown in FIG. 2 is provided with the coherent optical field receiver 135-1 for receiving the P polarization component 133 of the optical multilevel signal and the coherent optical field receiver 135-2 for receiving the S polarization component, so as to include the configuration of a polarization diversity in which the symbol decision circuit 143 selects one of two receivers to decide the symbol.

Further, since the coherent optical field receiving system requires the local laser 130 whose wavelength approximately meets the received light, there is a problem in that the wavelength management is complex. By adopting the polarization diversity configuration, the coherent optical field receiving system can receive the input optical signal even when there is fluctuation in the polarization state. However, there is a big problem in practical use in that the size of the hardware of the receiver becomes large because extra optical parts, such as the polarization splitter 131 or the optical splitter 102 and the like are required.

On the other hand, the optical multilevel signal receiver described in FIG. 3 performs only the binary decision on the intensity of the received signal and the relative phase difference, but cannot detect all the information of the optical field, for example, the combination of the amplitude value and the absolute phase value that are required to decide the 16QAM signal in FIG. 1(C). This is because the optical delayed detector used for these schemes is designed to detect the intensity signal variable depending on the relative phase difference between two consecutive symbols on a time axis and it cannot detect the absolute phase of each symbol. Further, since the decision is limited to a binary value, the optical delayed detector cannot perform the 8-level detection of the relative phase difference and the like that is required to decide the 16 APSK signal in FIG. 1(D).

In an example of FIG. 3, since a structure in which binary decision on received signal intensity and binary decision on relative phase difference are combined is adopted, N sets of receiver circuits are required as a general rule if the number of multilevel of a symbol increases to $2^N$, and the configuration of the receiver is complicated.

It is a second object of the present invention to realize an optical field receiver that detects all the information of an optical field by an incoherent scheme and compensates for linear degradation that has occurred during the transmission. In the delayed detection, it is generally considered that since the output signal intensity fluctuates due to the amplitude modulation component when the optical signal has amplitude modulation components, only the coherent optical receiving scheme using a local laser can obtain the optical field information. If all the field information can be obtained when the multilevel modulated optical signal including the binary amplitude shift keying in the prior art is received, it becomes possible to realize the dispersion compensation with very high precision by compensating the linear degradation that has occurred during the transmission, in the electrical circuit stage of the receiver.

Non-Patent Document 4 shows an optical receiver to solve the above-mentioned problems by a simple configuration. However, since such a waveform that is low accuracy in measurement as a frequency waveform of an optical signal is used, it is considered difficult to carry information on the phase of the optical signal even if wavelength dispersion compensation of an intensity modulated signal is actually possible.

The reason is that the frequency change becomes small when the phase change is slow and detection sensitivity degrades extremely because the frequency is derivative of the phase. At the same time, there is a possibility of occurring a large frequency change at a place where the phase of the optical signal rotates suddenly by the optical modulation or the transmission degradation. In this case, a dynamic range for measuring the optical frequency has to be expanded in order to receive an optical frequency waveform without degradation.

In order to expand the dynamic range, a frequency period of optical interferometer serving as an optical frequency discriminator has to be enlarged (in Non-Patent Document 4, FSR=200 GHz), that is, a delay time T has to be extremely shortened to 5 ps. This becomes a factor of further reducing the efficiency of frequency to optical intensity conversion in the optical frequency discriminator and results in degrading the measurement accuracy.

Further, when the optical intensity approaches zero because of modulation or transmission degradation of the optical signal, as the denominator of division approaches zero in the calculation of the optical frequency waveform VF, a measurement error further increases rapidly, with the result that the measurement is disabled. Non-Patent Document 4, however, does not describe about effective measures for this problem and leaves unsolved technical matters.

The present invention solves the above-mentioned problems and provides a simple and practical optical field receiver and an optical multilevel signal receiver.

Means for Solving the Problems

In order to achieve the above objects, in an optical field receiver and an optical multilevel signal receiver according to the present invention, a received optical signal is split into two signals, one of which is input to an optical intensity receiver and the other is input to an optical delayed detector having a delay amount Td, so that field information (amplitude and phase) of the optical signal is calculated from output signals of the two receivers.

In more detail, an amplitude r(t) is obtained by calculating a square root of an optical intensity signal AM(t) by an operation circuit. Further, a signal dQ(t) obtained from the delayed detector is normalized by dividing it with an amplitude product r(t)r(t+T), and a phase rotation amount occurred in a time Td is calculated by performing an arc sin operation. The above-mentioned field information is obtained by successively accumulating the phase rotation amount. According to the configuration, since homodyne detection is not performed, a local laser becomes unnecessary. Further, since the optical delayed detector has no dependence on polarization, it is able to realize an optical field receiver having no dependence on polarization can be realized.

In the above-mentioned configuration, for example, if the delay time Td is set to a half or less of a symbol length T (=1/R) of the optical signal, at least twice of optical field information can be obtained for each symbol and it is able to obtain the perfect field information satisfying Nyquist theorem and linear compensation, such as the wavelength dispersion compensation, etc. is completely performed. In the case where only the symbol determination of the binary and multilevel modulated signal is carried out, however, it may be permitted to set Td=T. If the value of Td is excessively small, the sensitivity of phase detection degrades. A realistic range of Td becomes T/5=1/(5R) (R is a symbol rate). At this time, the phase detection sensitivity degrades to about ⅕.

A balanced optical receiver is particularly preferable as the receiver connected to the optical delayed detector. Because the balanced optical receiver can eliminate direct current components unnecessary for the optical signal, it is possible to perform an ideal operation.

As the variation of the above configuration, optical intensity receivers may be connected individually to the two optical outputs of the optical delayed detector, so that such operations as will be shown in the following embodiments are performed on the difference component and sum component obtained.

The optical field receiver and the optical multilevel signal receiver of the present invention is very effective in terms of easiness and flexibility of the configuration when each signal is digitalized by using, for example, a high-speed A/D converter and complicated operation processing is realized by a digital operation. In this configuration, as the phase differences of the optical field must be calculated sequentially at a time interval Td, the sampling interval Tsa of the A/D converter has to be nearly equal to or sufficiently less than the time interval Td. If the signal band is small, as a correlation is kept between Tsa and Td even when Tsa is set to be somewhat larger than Td and the phase change is roughly calculated, there is a possibility that the digital operation is performed. In that case, however, theoretical limitation is Tsa≦2Td.

In order to calculate the phase rotation amount occurred within the time Td by using an arc sin function, it is essential for the phase rotation amount to be limited to π/2 or less. This limitation can be solved, for example, by making both the sampling interval Tsa of the A/D converter and the delay time Td of the delayed detector small and by frequently observing the phase rotation. In this case, however, the limitation of the operation speed of the A/D converter becomes a difficulty (at present, the least sampling interval is 25 ps). This difficulty can be solved by combining, at a transmitting side, the optical field receiver of the present invention with optical modulation that limits the amount of phase rotation between samples. It is effective to combine the optical field receiver of the present invention with, for example, a binary or multilevel phase modulation that limits the phase rotation amount to π/2, etc., a multilevel amplitude phase modulation, or a chirp-less or a small-chirp multilevel intensity modulation.

Further, as will be described in the following embodiments, the application range of the present invention can be further expanded if the wavelength dispersion range where the intensity of optical signal becomes zero or the phase rotation amount exceeds 90° is expanded, by intentionally making the extinction ratio of the transmission optical signal larger than 0.15 so as to be more degraded than the limit value (9 to 10 dB) of that in the a general optical transmitter.

In the present invention, by adopting a configuration that calculates the optical field information twice or more in one symbol, it is able to achieve perfect optical field compensation that performs inverse operation of the propagation characteristics of transmission line on the calculated optical field information. In this case, it is possible to remarkably improve the transmission characteristics of the receiver, such as the wavelength dispersion tolerance, etc. by providing with a fixed type compensation circuit or an adaptive type compensation circuit adaptive to degradation in wavelength dispersion and filter characteristic, etc.

In the present invention, however, there is a possibility of bearing a large drift in the reconstructed phase information when slight deviation occurred in such parameters as phase deviation in the delayed detector, asymmetry or offset in a dQ waveform, or a sampling timing of optical signals split into two, etc. In order to prevent this phenomenon, a configuration that stabilizes these parameters automatically so as to eliminate the time fluctuation of the reconstructed phase information and asymmetry in the up and down direction of the output waveform is effective For example, in the case where the optical field receiver and the optical multilevel signal receiver of the present invention are arranged in association with optical transmission equipment configuring an optical network, the total quantity of chromatic dispersion of the optical fiber along the optical signal path is calculated by a control terminal connected to the optical network. By transmitting the calculated value to the optical transmission equipment at the optical signal receiving side and providing it as an initial value of the compensation quantity to the optical field compensators of the optical field receiver and the optical multilevel signal receiver, it becomes possible to optimally set a quantity of compensation. According to this scheme, since re-calculated quantity of compensation can be rapidly set in the optical field compensator when the optical signal path is changed within the optical network, it becomes possible to make the adaptive compensation type optical field compensator unnecessary and to shorten the time to pull-in the adaptive compensation control into the optimal state.

Effects of the Invention

Since the optical delayed detector is used, the present invention is not dependent on the polarization state of the input light. Further, since a local laser is not needed unlike the coherent detection scheme in the prior art, the present invention can simplify the configuration of the receiver. In the incoherent type optical multilevel receiver in the prior art, the size of the circuit becomes large as the number of levels of the received signal is increased. However, since the optical field receiver and the optical multilevel receiver of the present invention can directly reconstruct the two-dimensional coordinate information on the complex plane of the received optical field, it is able to determined the symbol of the received signal in respect to the practical size of the hardware even when the number of levels of the optical modulation signal becomes large to improve the transmission efficiency. Furthermore, according to the present invention, since the field processing or multilevel decision of the received optical signal can be realized by the electrical digital circuit, a receiver having the same configuration is applicable to optical signals that are different in terms of the number of signal levels or modulation scheme.

Because the present invention can calculate the phase change of the optical signal with high accuracy, it is applicable to the binary or multilevel phase modulation having been considered as problems in Non-Patent Document 4. The phase modulation is higher in view of receiver sensitivity than the intensity modulation and has high tolerance against the non-linear effect of the optical fiber which was considered as a problem in the optical fiber transmission. Accordingly, the present invention is particularly suitable for long distance transmission. Further, it becomes possible to realize multilevel transmission with improved transmission efficiency by using the phase region.

Further, according to the present invention, since the receiver scale is about three times at most the binary intensity modulation (1.5 times the binary phase modulation and about ⅔ times the quaternary phase modulation) of the prior art, there is an effect that it is hard to reduce the transmission efficiency with respect to the hardware scale of the receiver even in the optical transmission having the small multilevel number. When the quaternary transmission is performed according to the present invention, the amount of transmission information becomes twice and the transmission efficiency can be improved more than the quaternary phase modulation transmission of the prior art. The present invention can also be applied to, for example, optical field waveform measurement equipment or optical space transmission equipment in addition to the receiver for optical fiber communication.

BEST MODE FOR CARRYING OUT THE INVENTION

Hereafter, exemplary embodiments of the present invention will be described with reference to the accompanying drawings.

First Embodiment

FIG. 4 shows an optical field receiver 100 according to the present invention and an optical transmission system of the first embodiment using the optical field receiver. FIG. 4(A) is a view showing a configuration of the optical transmission system, wherein optical signal paths are shown by a thick line and electrical signal paths are shown by a thin line.

In the first embodiment, an optical transmitter 300 is a transmitter of binary phase modulation light. An unmodulated laser beam output from a laser 301 is input to an optical phase modulator 303 to perform phase modulation by applying a binary digital information signal 302 whose symbol rate is R to a modulation terminal of the optical phase modulator, and output from as a transmission optical signal 305 (optical field E(n)). The phase modulation is carried out so that a phase angle θ between signal points corresponding to a mark and a space of the information signal becomes equal to π/2, as shown in a signal constellation of FIG. 4(B).

FIG. 4(C) shows a phase waveform of the transmission optical signal 305. The phase of the optical signal transits centering a symbol boundary and takes either value of "m" or "s" at the center of the symbol. A phase interval (modulation amplitude) is π/2. The interval T of symbols is a reciprocal of symbol rate R, wherein T=1/R. Since binary modulation is performed in the embodiment, the symbol rate R becomes equal to a bit rate Rb. The transmission optical signal 305 is transmitted through a optical fiber transmission line 304, subjected to transmission degradation by wavelength dispersion, etc., of the optical fiber, and input to an optical field receiver 100 of the present invention as input optical signal 101.

The input optical signal 101 is split into two optical signal paths 103-1 and 103-2 by an optical branching circuit 150 and input to an optical delayed detector 104 and an optical intensity receiver 151, respectively. The optical delayed detector 104 comprises a first optical path for delaying an input signal by a symbol time T/2 and a second optical path with a phase shifter having a phase angle −π/2 so as to deviate the phase by π/2 from each other on the two optical paths. The optical field of optical multilevel signal having been phase-shifted is interfered with the optical field of an optical light preceding by a delay amount Td=T/2. The delay amount Td becomes a time interval of the phase reconstruction of the optical field in the present invention.

The phase amount of the phase shifter indicates, in a strict sense of the word, the amount of phase delay in the path on a delay side through which the delayed optical field passes. However, if a sign of the phase amount or the path including the phase sifter is different, it merely results in reversing the sign of the output signal and it can be easily corrected by performing a sign inversion operation on the electrical signal or a complex conjugate operation on the reconstructed optical field, etc. Therefore, in the following description, either will be allowed for the sign of the phase amount and the path in which the shifter should be arranged.

Two optical signals output from the optical delayed detector 104 are differentially received by an optical balanced receiver (photo detector) 105, converted into electrical signals, and converted into a digital signal by an A/D converter 106-1. The optical signal received by an optical intensity receiver 151 is similarly converted into an electrical signal and converted into a digital signal by an A/D converter 106-2. To the A/D converters 106-1 and 106-2, a sampling clock 107 is supplied from a clock oscillator 310 for generating clocks of frequency 2/T so as to perform digital sampling at a period of twice per one symbol. In the embodiment, a portion of output signal of the optical balanced receiver 105 is supplied to the clock oscillator 310 and so that clock component is extracted in synchronizing with a timing of phase transition in the received optical signal. By this way, it is able to perform digital sampling always at a desired timing (a center or a boundary of the symbol, etc.) in the symbol of the received optical signal.

The digital signals output from the A/D converters 106-1 and 106-2 are input to delay adjustment circuits 108-1 and 108-2, respectively, and after adjusted such that the timing deviation at two signal paths becomes equal to or less than the delay time Td of the optical delayed detector 104, supplied to a field processing unit 111 as a dQ signal 311 and an AM signal 312.

FIG. 5(A) shows one example of time waveforms of these electrical reception signals. Here, a number indicating a sample point at any time t is expressed by n and the received optical signal is represented by E(t)=E(n)=r(n)exp(φ(n)). In this case, the AM signal and the dQ signal may be written by $AM(n)=r^2(n)$ and $dQ(n)=r(n)r(n-1)\sin(\Delta\phi)$, respectively. Herein, $\Delta\phi=\phi(n)-\phi(n-1)$.

The AM signal 312 is input to a square root processor 112 in the field processing unit 111 and an amplitude r(n) 320 of the reconstructed optical field is obtained as an output of the square root processor 112. Although the square root processor 112 may be composed by a digital operation circuit, for example, it may be replaced with a configuration where square root data are previously stored in a memory and retrieved by a table search or a configuration realized by an analog circuit.

On the other hand, as represented in the above equation, information on an n-th sample and an n−1 sample just before the n-th sample is mixed in the dQ signal 311. In the first embodiment, a "y" signal 315 is obtained in such a manner that a divider 313-1 divides the dQ signal 311 by previous amplitude information r(n−1) which is obtained by delaying the amplitude information r(n) by a time Td=T/2 through a delay circuit 314, and a divider 313-2 divides an output of the divider 313-1 by the amplitude information r(n). As a result, y becomes equal to sin(Δφ).

The y signal 315 is input to an arc sin operation circuit 316 and converted into a phase difference signal (Δφ) 317 by performing an arc sin operation thereon. AS described above, since the Δφ is a phase difference of the optical field between sampling points, a phase φ(n) 321 of reconstructed optical field can be obtained by adding a phase θ(n−1) of a symbol having been received just before to the phase difference Δφ by a delayed adding circuit 318.

In general, since the phase of optical signal fluctuates slowly with time by the phase noise of the laser or the temperature change of the optical fiber length, and the like, the initial phase φ(0) of the optical signal is indefinite. For this reason, in the delay adding circuit 318, it is preferable to start the operation by setting a proper initial phase (for example, 0). In the case where the transmission side uses a multilevel phase modulation, and the like, and an absolute phase has to be determined, a correct phase angle may be obtained by learning from a fixed pattern in the transmission phase modulated waveform or estimating from a received pattern or truth/false decision of a header.

This decision on such an initial phase or initial amplitude is a common problem in the optical communication field and the radio communication field. Therefore, other methods known in these communication fields other than the above-mentioned solutions are applicable to the optical field receiver of the present invention. For example, a reference signal having a phase angle or an amplitude value previously known may be inserted into the transmission signal. A technology, such as differential modulation, etc., that does not need the decision on the initial phase or the initial amplitude may be also applicable. Further, it is preferable to adjust the initial phase or amplitude through adaptive learning from statistical distribution of reconstructed signal points so as to enable normal reception.

As described above, when the phase difference between the sample points of the optical field is calculated by using the arc sin operation, the change in the phase angle can be calculated only within a range of ±90° at the maximum. This is one of essential features of the present invention.

FIG. 5(B) shows the appearance of amplitude r(n) 320 and the phase φ(n) 321 of the reconstructed optical field. Since the field processing unit 111 of the embodiment successively performs the field reconstruction operation for each interval Td=T/2, the field information of two points per one symbol time T can be obtained. In other words, according to Nyquist theorem, when the received optical field signal does not include frequency component more than the symbol rate, the optical field reconstructed as the digital signal in the receiver maintains the entire information of the received optical field. If the assumption of the above-mentioned Nyquist theorem is broken by the non-linear effect of the optical fiber or leaking into of optical signals having different wavelengths, it is preferable to remove the high frequency component by passing the received optical signal to a sufficiently narrow band optical filter or by passing the received signal or the reconstructed field signal to a sufficiently narrow band anti-aliasing filter (low pass filter).

Next, these reconstructed optical field signals are input to a quadrature conversion circuit 322 in order to convert into field signals 323 represented by a quadrature coordinate, and after that, input to a compensation operation circuit 324 for correcting input signals by an inverse characteristic of a transfer function of the transmission line. The compensation operation circuit 324 can completely compensate for linearity degradations, such as wavelength dispersion of the optical fiber or optical components, band limitation of optical components, and the like.

Field signals 325 having been compensated are input to a detection/decision circuit 326 and output as digital information signals detected and decided by a detection scheme corresponding to a modulation scheme of the information signal at the optical transmitter 300. In the case of the embodiment, since the input field information is 2 samples/symbol, the detection/decision circuit 326 may perform the decision at an optimum decision timing where the eye-opening is maximum, by providing, if necessary, such functions as a sampling function, a clock extracting function, a decision function of a maximum eye-opening, etc., as in a decision unit of a general receiver.

In the first embodiment, since the transmitting side performs the binary phase modulation with modulation amplitude of $\pi/2$, the binary digital signal can be reconstructed by adopting as a detection scheme, for example, an electrical delayed detection (phase difference 0) with a delay time of symbol time T and performing binary decision on the output signal. When the information signal is reconstructed by the electrical delayed detection in this manner, it is preferable to perform differential encoding at the transmitting side.

As described above, the optical field receiver of the present invention can receive an optical signal, whose phase rotation amount during the time Td is within ±/2 at the maximum. For this reason, the phase modulation amplitude (=phase rotation amount of one symbol time) in the optical phase modulator 329 is set to $\pi/2$. As a result, if the phase calculation interval Td is ½ of symbol time, the phase change during Td becomes ±/4, which sufficiently stays within the above-mentioned limit. As will be described later, since the phase rotation also increases depending on the wavelength dispersion, etc., the above-mentioned limit must be satisfied taking this increased amount into consideration.

In the case where an optical signal with a further increased phase rotation angle has to be received, the phase rotation amount calculation interval may be shortened by making the value of Td (the delay amount of optical delayed detector) small. In the present invention, however, the sampling interval Tsa of the A/D converter has to be almost equal to or less than Td. If Td is too small, increasing of the sampling rate and the field operation speed will complicate the configuration of circuit. Therefore, for example, in the case of dispersion compensation for an optical signal of 10 Gsymbol/sec, the field sample should be obtained twice at the minimum in each symbol by setting Td to or less than about 50 ps. At this time, because the required sampling time is 50 ps, it is able to shorten the sampling time to about 25 ps by performing two times of oversampling, which is a level achievable by a current A/D converter.

In Non-Patent Document 4, the delay amount of the delayed detector is set to only 5 ps. In this case, according to the above-mentioned rule of the present invention, the sampling interval Tsa must be equal to or less than 2.5 ps, that is, the sampling rate of the A/D converter has to be 400 GHz or more. Such a high speed seems impossible for the current technology to achieve. It will be appreciated from this matter that the present invention differs in technology from that of Non-Patent Document 4.

In FIG. 4(A), in order to couple between optical parts on the optical signal path 103, various coupling method, such as a coupling between optical parts by an optical fiber, a coupling by a bulk-optical component/free space beam, a coupling between integrated optical components by a waveguide, and the like, are applicable. In particular, as shown in FIG. 4(A), if the optical delayed detector 104 is combined with the balanced optical receiver 105, there are advantages such that the amplitude of the output signal from the detector is doubled and an unnecessary direct current signal is eliminated. Although it involves some limitations, a general optical intensity detector is applicable instead of the balanced optical receiver 105. In this case, from the viewpoint of eliminating the unnecessary components, it is preferable to adopt a balanced type reception in which optical intensity receivers are arranged at two outputs of the optical delayed detector, respectively, and after them, subtraction between the electrical signals and detection of the difference are performed. The detection of difference may be realized by the digital operation after performing digital sampling on the outputs of optical intensity receivers.

The delay adjustment circuits 108-1 and 108-2 are inserted in order to adjust the signal propagation times on the two signal paths formed between the field processing unit 111 and an optical branching circuit 150 to be a branching point of the optical signal and to match the operation timings. These delay adjustment circuits can also be realized, for example, by digital buffer circuits using over-sampling, etc. However, in the case of adopting a configuration including two signal paths whose length having been completely adjusted during the manufacturing process, the delay adjustment circuits 108-1 and 108-2 can be omitted. Fine adjustment of the signal timing may be controlled, for example, with a supplying timing of sampling clocks supplied to the A/D converters 106-1 and 106-2.

In FIG. 4(A), the digital delay adjustment circuit 108-1 (108-2) is arranged after the A/D converter 106-1 (106-2), but they may be reversely arranged by using an analog delay line as the delay adjustment circuit. By omitting the A/D converter 106, operation functions of the field processing unit 111 and a portion or all of the subsequent processing may be realized by analog circuits. In this case, however, a partial loss of advantages of the present invention is inevitable because the configuration and adjustment are complicated.

Although a polar coordinate $(r(n),\phi(n))$ type is exemplified as the field processing unit 111, a quadrature (Cartesian) coordinate $(I(n),Q(n))$ type is also applicable. In this case, the field processing unit may be configured so as to obtain $\Delta I(n)$ and $\Delta Q(n)$ from $r(n)$ and $\Delta\phi$ by inserting a coordinate transformation circuit and successively operate $I(n)$ and $Q(n)$. This configuration needs a rotation operation of the angle $\Delta\phi$ using $\sin(\Delta\phi)$ and $\cos(\Delta\phi)$. A configuration may be adopted in which the former uses the y signal as it is and the latter is calculated by the operation, such as $\text{sqrt}(1-y^2)$.

The functions of the field processing unit 111 can be realized, for example, with FPGA, ASIC, DSP, or a processor capable of reconstructing the functions. All the functions of the field processing unit 111 or the operation function portions, for example, a divider 313, a square root processor 112, an arc sin operation circuit 316, etc., inside the field processing unit may be realized with dedicated digital operation circuits, a table look-up scheme, or analog circuits. In the field processing unit 111, other functional circuits, for example, an automatic gain control (AGC) circuit for normalizing the amplitude or intensity of the signals and an exceptional processing function for error, for example, a function of prohibiting subtraction when $r(n)=0$, and the like may be provided if necessary.

In the case where sufficient calculation speed is not obtained in the field processing unit 111, it is effective, for example, to develop the calculation process in parallel, or time-divide a train of field data into a plurality of packets so that they are processed by a plurality of field processing units and plural operation results are combined. When the field data train is processed in the divided form as described above, it is necessary to perform adjustment so as to make the optical field phase continuous at connecting portions of each data train. This problem can be solved with the processing, for example, by performing time-dividing in such a manner that several bits of overlapped portions are formed between the data trains and by correcting the data trains so as to adjust the phase at these overlapped bits.

If the same operation results are obtained as a result, it may be permitted to appropriately change the operation sequence or configuration. For example, a configuration in which the order of two dividers 313 is reversed, a configuration in which the dividing circuits 313 is configured so as to calculate the reciprocal of amplitude information and multiplies it with dQ, a configuration in which a product of $r(n)$ and $r(n-1)$ is calculated first by a multiplying circuit and dQ is divided by the product, and the like, are considered. When the amplitude information becomes temporarily zero because of noise, zero setting of field amplitude as will be described later, and the like, there is a possibility of inducing fatal problems, such as occurrence of subtraction error or infinite results. In order to avoid these problems, it is possible to adopt a configuration that limits the range of y signal 315 within from +1 to −1 or outputs zero subtracting errors to outside.

In the present invention, the delay time of delay circuit 314 has to be almost accorded with the delay time Td of the optical delayed detector 104. In the first embodiment, as the sampling interval Tsa is set so as to be Tsa=Td=(T/2), the time delay corresponds to just one sample. In the specification, although several embodiments different in the delay time Td of the optical delayed detector 104 will be illustrated, the delay time of the delay circuit 314 has to be almost accord with Td in every embodiment.

In the arc sin operation circuit 316, it is considered that the execution of operation has possibility of falling into an unable state when the range of input y signal 315 deviates from a definition range of arc sin (from +1 to 1) because of the noise in the optical signal or the electrical circuit, operation error, the error of circuit characteristics, and the like. In order to avoid this problem, for example, there exists a method of substituting an approximation function which Taylor-expands the arc sin function up to a constant order for the arc sin operation circuit or a method of providing with a limiter characteristic so that the input signal does not deviate from the definition range from +1 to −1. For example, if Taylor expansion $(y+y^3/6+y^5 \cdot 3/40)$ up to a five order of arc sin function is used, sufficient accuracy can be approximated without deviating the definition range.

If the linearity degradation of the optical signal can be compensated, any degradation compensation function is applicable as the compensation function to be mounted on the compensation operation circuit 324. The compensation operation circuit 324 may be provided with a function of compensating for a plurality of degradation factors simultaneously. Further, such degradation not necessarily linear as a self-phase modulation effect which is a non-linear effect of the optical fiber is also compensative to some degree. Since the degradation of this case corresponds to one that the phase of optical intensity rotates in proportional to the optical intensity, reverse compensation may be performed so that the signal constellation becomes proper, by estimating the rotation amount of phase from the amplitude or arrangement, etc., of the signal points obtained by the field reconstruction.

FIG. 6 shows an example of the experimental results that verifies the operation of the present invention. In the experiment, the symbol rate of the optical signal is 5 Gsymbol/sec (T=200 ps), an optical transmitter capable of generating the binary phase modulated light with the modulation amplitude $\pi/2$ is adopted, and the transmission line comprises a standard signal mode fiber of 160 km, the chromatic dispersion amount of which is 2720 ps/nm. The delay amount of the optical delayed detector 104 is assumed to be Td=T/2=100 ps. Although the entire configuration is almost the same as FIG. 4(A), the sampling is performed using a high-speed digital oscilloscope, the sampling interval is 50 ps (sampling rate Tsa=20 G sample/sec) which is half the value of Td, and the processing subsequent to the field processing unit 111 was realized by personal computer simulation.

In FIG. 6, FIG. 6(A) shows an example of the waveforms of digitalized actual AM signal 312 and dQ signal 311. Naturally, the optical phase modulation does not have the intensity modulation components. However, as the phase modulation is converted into the intensity modulation by the wavelength dispersion of the optical fiber, intensity modulation components are generated at the switching point of the bit phase. FIG. 6(B) shows I and Q components after the reconstruction and dispersion compensation (applying −272 Ops/nm by the numerical operation), wherein transition of a rectangle involved in the phase modulation can be observed.

FIG. 6(C) is an intensity waveform view showing field amplitude 320 of the reconstructed light. FIG. 6(D) is a view plotting reconstructed light field 323 on a complex plane. A trace on the complex plane of a quarter of a circle approximating FIG. 4(B) is obtained, but the amplitude change which does not originally exist appears in FIGS. 6(C) and 6(D) and large degradation is found. FIG. 6(E) shows the delayed detection waveform in the case where the delayed detection of one symbol time T is performed directly by the detection/decision circuit 326 without passing the reconstructed optical field 323 to the compensation operation circuit 324. The waveform is degraded to the extent that eye-opening can be hardly obtained.

To the contrary, FIGS. 6(F), 6(G), and 6(H) show examples of the field amplitude, the optical field phase, and the delayed detection waveform in the case where the inverse function of transfer function of the optical fiber (wavelength dispersion corresponding to −2720 ps/nm) is applied by the compensation operation circuits 324, respectively. It can be appreciated that the amplitude fluctuation of the optical field having been compensated is suppressed so as to be extremely small as shown in FIG. 6(F), the trace on the complex plane almost completely matches FIG. 4(B) as shown in FIG. 6(G), and the transmission optical field is reconstructed correctly. FIG. 6(H) shows the delayed detection waveform in the case where the delayed detection of one symbol time is performed directly by the detection/decision circuit 326 after the dispersion compensation. The binary eye-opening is obtained extremely clearly. As such, the principle and effect of the present invention is verified experimentally.

Second Embodiment

FIG. 7 shows an optical field receiver 100 according to the present invention and an optical transmission system of the second embodiment using the optical field receiver.

In the second embodiment, the optical transmitter 300 generates a binary intensity modulated light as a transmission optical signal 305 by applying the binary digital information signal 302 to the optical-intensity modulator 329. In the optical field receiver of the present invention, because the reconstruction of optical field becomes difficult when the optical signal intensity is about 0, the extinction ratio of the optical signal in the transmission optical signal 305 is previously degraded intentionally so as to be 0.1 to 0.3

The input optical signal 101 having been input to the optical field receiver 100 is branched into two ways by the optical branching circuit 150, in similar to the first embodiment. One of the branched optical signals is converted into an electrical signal by the optical delayed detector 104 whose delay amount is Td=T/2 and the balanced optical receiver 105, and converted into a digital signal by the A/D converter 106-1. In the embodiment, the clock oscillator 310 oscillates freely at a frequency of four times the optical symbol rate. As a result, the sampling interval Tsa of the A/D converter 106-1 becomes Td/2, and actually twice oversampling is performed.

The other of the branched optical signals is converted into an electrical signal by the optical intensity receiver 151 and converted into a digital signal by the A/D converter 106-2.

In the embodiment, the phase change Δϕ of the optical signal is calculated, by using the delay time Td of the optical delayed detector 104 as the operation interval of the field processing unit 111. In the embodiment, therefore, the digital signal of the interval Td/2 output from the A/D converter 106-1 (106-2) is down-sampled to half by the re-sampling circuit 332-1 (332-2), so that the sampling intervals of dQ signal 311 and AM signal 312 to be input to the field processing unit 111 are equal to Td.

Further, the re-sampling circuit 332-1 (332-2) makes it possible to perform the changing the sampling timing of the output signal and the fine adjustment of the period. Therefore, even if the clock oscillator 310 is in a free oscillating state and the oscillation frequency or the timing deviates from the timing of the input optical signal 101, it is able to correct so as to match both upon re-sampling. If there is no need to consider escaping zero as will be described later, no obstacles in reconstructing the field occurs even if the frequency or timing of the clock oscillator deviates from the input optical signal. In this case, it is preferable to perform such processing as the field reconstruction and compensation, and the like, while the timing and period of the symbol of the information signal or the sampling point deviates, and perform the extraction of the symbol timing at the time of processing of the final identification and decision of the digital signal.

In order to accord the inputting timings of the dQ signal 311 and the AM signal 312 to the field processing unit 111, the embodiment adopts a configuration in which a variable optical delay circuit 330 and a variable high frequency delay circuit 331 are provided so as to physically delay the arrival timing of the AM signal. The delay adjusting circuit may be constructed by any of optical circuit and electrical circuit, and a variable type or fixed type delay means can be arranged in free combination on at least one of the path of the dQ signal 311 and the path of the AM signal 312.

The field processing unit 111 operates the reconstructed optical filed 333 of polar coordinate. The operation result is converted into an optical field of quadrature coordinate representation by the quadrature conversion circuit 322 and transmission degradation is compensated by the compensation circuit 324. After that, the optical field is input to the decision-feedback equalizer 33, thereby to perform equalization of waveform by digital filtering, such as decision of received symbol, removal of the inter-symbol interference, and the like.

In the embodiment, since the optical signal is subjected to the intensity modulation, square-law detection, envelope detection, and the like are first performed on the optical signal by the decision-feedback equalizer 334. Next, the compensation is performed by a FFE (forward feedback equalization) circuit, a decision circuit, DFE (decision feedback equalization) circuit, and the like. At this time, an optimize compensation is performed so as to maximize the eye-opening amount or to minimize the mean square error of the compensated signal and the decision result.

In the embodiment, the eye-opening amount 350 obtained from the decision-feedback equalizer 334 is input to the compensation amount optimization circuit 328 and a designated value of the compensation amount (for example, the amount of the chromatic dispersion) is input to a compensation amount input terminal 207-1 of the compensation circuit 324. In the compensation amount optimization circuit 328, it is possible to automatically control the compensation amount to be the optimal compensation amount at any time by changing the compensation amount so that the eye-opening amount 350 is maximized. The compensation amount may be set by inputting an appropriate compensation amount to a compensation amount input terminal 207-2 from the outside. For example, if the distance of the fiber link or the corresponding amount of chromatic dispersion is already known, its reverse amount may be set as the compensation amount.

FIG. 7(B) shows a signal point constellation of optical signal in the case where a 10 Gbit/sec of chirp-less binary intensity modulated light (extinction ratio 10%) is input as the transmitted light. FIG. 7(C) shows the results of simulation of optical field distribution after the optical waveform has been transmitted for 180 km by a conventional dispersion fiber.

After the optical fiber transmission, as shown in FIG. 7(C), complicated phase rotation and intensity change occur. If the wavelength dispersion is in this range, the amplitude of the optical signal does not become zero and the phase rotation angle of the optical signal stays in the order of ⅔π between any sample points. If the optical modulation is in such a range, the present invention is sufficiently applicable. In the optical fiber transmission technology of the related art, there exists little concept as to the field construction of the optical signal. For this reason, even in such a situation as the present invention that limits the amount of phase rotation, practical optical field reconstruction and wavelength dispersion are not known at all. This concept is first suggested by the present invention.

FIGS. 8(A), 8(B), and 8(C) show the appearance of the transmission optical intensity waveform, the reception waveform, and the sampling in the second embodiment. As shown in FIG. 8(A), in the transmission waveform, the optical intensity is modulated at the center of each symbol so that it becomes any one of the mark (m) and the space (s). When the waveform degradation occurs due to the wavelength dispersion by the optical fiber transmission, the reception waveform is distorted as shown in FIG. 8(B). In particular, when the amount of the chromatic dispersion becomes larger than a predetermined degree, signal points such as points P and Q where the optical signal intensity approaches zero occur. Even if the optical intensity is not complete zero actually, there is a risk of approaching zero owing to the noise of the optical signal. In the specification, this phenomenon is referred to "zero hit".

When the zero hit occurs, the calculation error of division operation increases in the field processing unit 111. As a result, there is a possibility of abnormal increasing of reconstructed light phase error and falling into a state where the phase can not be calculated. In order to avoid the zero hit, for example, as in the second embodiment, a method to perform the oversampling that increases the sampling rate of the A/D converter, extract a sampling point avoidable the zero hit upon re-sampling, and input it to the field processing unit 111 is effective.

FIG. 8(C) shows an example where two times over-sampling was performed. There are four sampling points (white circle and black circle) per one symbol in the AM signal and the dQ signal. In general, it is frequent that the zero hit of waveform occurs at an interval of a period twice the bit rate. In the second embodiment, the zero hit occurs at the center and the border of the waveforms that matches even sampling points (white circle). In this case, it is possible to avoid the problems due to the above-mentioned zero hit by extracting only odd sampling points (black circle) and using it in the field operation.

When the zero hit occurs at both of the even and odd sampling points, new sampling points may be generated in the middle of the odd and even points by performing interpolation operation upon the re-sampling. It may be permitted to prepare two field processing circuits for the even sampling and the odd sampling, respectively, and generate the output field by selecting properly one of them at which the zero hit does not occur. Further, when the zero hit occurs due to influence of noise, etc., a recovery method to re-start from the estimation of the field phase after the end of zero hit.

FIG. 9 shows a verification result of the application range of the present invention, wherein the minimum value of optical intensity of 10 Gbit/sec binary intensity modulated signal and the phase rotation amount occurred during the time Td (in the example, 50 ps) are investigated by using the optical transmission simulation.

FIG. 9(A) shows a case where an optical signal of α=1 is transmitted through a 180 km of general dispersion fiber (wavelength dispersion amount 3000 ps/nm). It is understood that, as shown by a thick line (normalizing the average value of mark level to 1), a point where the optical intensity waveform becomes almost zero occurs and as shown in a dotted line (unit is π radian), the phase rotation amount occurred during the time Td exceeds ±0.5 so that the present invention cannot be applied.

FIG. 9(B) plots the minimum intensity (thick line) of the optical signal and the maximum phase rotation amount occurred during Td, by changing the wavelength dispersion to be applied to the binary intensity modulated light of α=1. In FIG. 9(B), the zero hit occurs when the minimum intensity becomes near zero (about 0.05 practically), and calculation of phase rotation amount becomes impossible when the maximum phase rotation amount exceeds 0.5 (about 0.4 practically). In both case, application of the present invention is impossible. In other words, an applicable range of the present invention is the range of the chromatic dispersion amount where the above phenomenon does not occur.

Although the extinction ratio of the transmission optical signal is used as the parameter in the drawing, when the extinction ratio is 0.1, the applicable wavelength dispersion range becomes −1000 to ±500 ps/nm at the most. This range is equal to wavelength dispersion tolerance of a 10 Gbit/sec binary intensity modulated light of α=1 approximately. In this case, it is hardly to find the advantages of using the present invention. However, if the extinction ratio is intentionally degraded to 0.3 and the space level is raised, because occurrence of the zero hit is made difficult and the phase rotation amount decreases, it can be appreciated that the applicable wavelength dispersion range is expanded to −1700 to 4000 ps/nm. As such, in the present invention, the applicable range can be expanded by degrading the extinction ratio of the transmitted light.

FIG. 9(C) plots the minimum intensity (thick line) and the maximum phase rotation amount in the case where the wavelength dispersion to be applied to the chirp-less binary intensity modulated light of α=0 is changed. In the example, the applicable wavelength dispersion range is about ±1100 ps/nm when the extinction ratio is 0.1 and is larger than ±6000 ps/nm when the extinction ratio is about 0.3. It can be appreciated that the applicable range is more expanded by using the chirp-less light and also, by intentionally degrading the extinction ratio.

As such, limitation in the detection of zero hit and the phase rotation amount is largely mitigated by adopting the chirp-less intensity modulated light at the transmitting side, degrading the extinction ratio, or adopting the phase modulation where the phase rotation amount is limited as the above-mentioned example.

Third Embodiment

FIG. 10(A) shows the optical field receiver 100 according to the present invention and an optical transmission system of the third embodiment using the optical field receiver. In the third embodiment, a quaternary optical amplitude and phase modulator is used as the optical transmitter 300. For example, two groups of binary digital information signals 302-1 and 302-2 are input to an optical intensity modulator 329 and the optical phase modulator 309, respectively, so that a transmission optical signal 305 of the quaternary amplitude and phase modulation is generated by modulating the intensity and phase into two-levels, respectively.

FIG. 10(B) shows an example of the signal constellation of quaternary amplitude and phase modulated light. In applying to the present invention, the maximum phase transition θ between signal points is preferable to be limited to a predetermined value or less, in similar to the above-mentioned embodiments. In the case of measuring the phase of two points between the symbols, the range of θ becomes equal to π logically. In actually, however, it is preferable to hold the range within about π/2 in consideration of the increase of phase rotation amount or the influence of noise in the optical fiber transmission.

FIGS. 10(C) and FIG. 10(D) show examples of other signal constellations having the same effect.

In FIG. 10(C), the amplitude has three levels, which can be generated by using a ternary encoder at the modulator side. FIG. 10(D) shows a quaternary signal constellation which is the optimal from the viewpoint of the receiver sensitivity because the interval between the signal points is maximized. This signal constellation is also obtainable easily by using a proper encoder. In order to generate such an arbitrary multi-level optical signal, a quadrature type Mach-Zehnder optical modulator having two modulation electrodes and capable of generating arbitrary signal constellation, is effective. Further, in the present invention, it may be permitted to increase the number of levels (the number of signal points) more than the examples shown here.

The third embodiment is an example in which the delay amount Td of the delayed detector is set to ¼ of the symbol time T, and also the sampling interval of the A/D converter 106 is set to T/4. As a result, since the phase rotation amount calculation interval Td becomes ½ as compared to the previous embodiments, it is detectable larger phase rotation amount. The re-sampling circuit 332-1 (332-2) has a function of retaking only the sampling timing without changing the sampling rate, whereby it is possible to maintain an appropriate sampling timing at any time even when the clock transmitter 310 is in a free oscillation state.

In the third embodiment, the phase shift amount of the optical delayed detector 104 and the delay amount of the tunable high frequency delay circuit 331-1 are automatically controlled by the automatic control circuit 341 so that the average value becomes zero, by extracting the phase 321 of the reconstructed optical field from the optical processing unit 111 and performing the averaging processing by the average circuit 340. In the present invention, if noises due to a transmission laser and an optical amplifier (for example, the fluctuation of optical phase), the direct current offset of the dQ signal or its timing deviation from the AM signal, the deviation of shift amount in the optical delayed detector 104 from π/2 (or −π/2), and the like occur, they affect as factors of temporally fluctuating the phase of optical field reconstructed by the field processing unit 111.

In order to suppress these factors, for example, it is preferable to calculate an average value of the phase of the reconstructed field and to perform automatic control so that the value becomes zero or to be a predetermined value at any time. The compensation method is not limited to that of the embodiment. For example, a method of eliminating a slow fluctuating component from the reconstructed optical phase 320 by merely a high-pass filter in the field processing unit 111 or other methods, such as installing of a subtractor for direct current component of the dQ signal, can be adopted. In order to eliminate the asymmetry of the waveform caused by the electrical circuit characteristics, a non-linear adaptive filter circuit, and the like may be provided.

It is impossible to completely suppress the phase fluctuation due to the noise, etc. In the decision of the multilevel signal as in the third embodiment, the above-mentioned delayed detection is effective for suppressing the influence of phase fluctuation. Further, by the decision-feedback equalizer 334 of the third embodiment, it is possible to eliminate the error component of the relatively slow phase by calculating the phase error component based on the previous phase decision result. As a result, by comparing Euclidian distance between the obtained signal point and the ideal signal constellation as shown in FIG. 11(B), a signal point that is nearest to the obtained signal may be decided as the received symbol.

In a system that calculates the optical field information successively as in the present invention, there is a possibility of inducing error propagation over a long time in the worst case because the influence of noise or operation errors is accumulated. As a method of preventing the error propagation, there exists, for example, application of coding, such as the differential coding, to the amplitude or the phase, periodical insertion of previously known reference code at the transmitting side, etc. Further, such a method as statistical distribution of the received signal points or successive decision feedback from a specific signal point, and the like is also applicable.

In the embodiment shown here, the minimum distance rule is applied to the decision of received symbols, but other conventional symbol decision methods being used for the multilevel signal in the radio communication field are also applicable. For example, preferential determining of any one of the phase and the amplitude radius, MLSE using the field state of plural continuous symbols, a most likelihood decision (Viterbi decoding), a soft decision FEC (Forward Error Correction), a trellis encoding/decoding processing, and the like, are also applicable. Further, instead of a simple square distance decision, for example, a non-Euclidian distance defined previously in accordance with the noise generation factors, such as noise or thermal noise of an optical amplifier, crosstalk, and the like, may be apply to the decision criterion. Further, the symbol decision circuit may be formed, for example, in an analog type structure that specifies the input symbol by selecting a filter having a maximum output from among a plurality matched filters arranged in parallel in association with each symbol.

Fourth Embodiment

FIG. 11(A) shows the optical field receiver according to the present invention and an optical transmission system of the fourth embodiment using the optical field receiver. In the optical transmitter 300 of the fourth embodiment, the binary digital information signal 302 is input to an error correcting code adding circuit 343 to apply a 7% overhead of error correcting code. The optical transmitter 300 is of a differential optical phase modulation type and generates five signal points having a 72° interval as shown in FIG. 11(B), by performing coding by a differential coding circuit 346 and inputting its output signal to two optical phase modulators 303-1 and 303-2.

In the fourth embodiment, the binary differential phase modulation is performed according to whether the phase state in a certain symbol has changed by +72° or −72°. In the present invention, since there is a limitation only in the phase change from the just previous sample point, any differential phase modulation where the phase rotation amount is limited can receive it without a problem. The number or interval of the signal points can be arbitrarily changed. A multilevel differential optical phase modulation that permits the movement between plural symbols may be applied to the optical transmitter 300.

The fourth embodiment is an example where the delay amount Td of the optical delayed detector 104 in the optical field receiver 100 is made equal to the symbol interval T. According to this configuration, although the compensation function of the above-mentioned wavelength dispersion is lost, it is possible to perform various receiving of binary or multilevel modulation by a simple configuration. Further, since the optical intensity receiver 151 is provided, it is possible to realize compensating the deviation of signal points due to the optical fiber non-linear effect, etc.

When the FEC, and the like is applied as in the embodiment, for example, the symbol rate has possibility of effectively increasing in the coding circuit 343. In this case, if the increase of the symbol rate stays within a certain extent, the problem is solved by obtaining the waveform while fixing the sampling rate of the A/D converter and correcting it during the retiming processing performed in the re-sampling circuit 332-1 or the decision-feedback equalizer 334.

For example, in the case where the sampling interval is assumed to be T/2 with respect to the symbol interval of the original information signal, it seems that the Nyquist theorem is not satisfied if the symbol rate increases 7% in the coding circuit 343, but it is not necessarily so. This is because the frequency band occupied by the signal is smaller than the reciprocal (1/T) of the symbol rate and this stays normally within a range from T/2 to 1/T in the general optical modulation, and there is room for the slight increase in the symbol rate. Further, there is no problem even if the delay amount Td of the delayed detector is not strictly adjusted to an integral multiple of the sampling interval Tsa and has a slight deviation, because there is a sufficient waveform correlation when the extent of deviation is about 10 to 20%.

In the fourth embodiment, a feed forward equalizer (FFE) circuit 352-1 (352-2) is arranged just after the A/D converter 106-1 (106-2) to perform equalization processing on the electrical signal waveform by a digital filter. In other words, a high-speed optical receiver, such as the balanced optical receiver 105, the optical intensity receiver 151, and the like, and electrical wirings or components, such as delay circuits have individual frequency characteristics, and the transfer characteristic is not always flat. Therefore, the inter-symbol interference or the error of frequency characteristic is eliminated so as to obtain the optimal waveform, by inserting FEE circuit or DFE circuit which is an adaptive filter and performing adaptive compensation so that the eye-opening obtained from a decision-feedback circuit at the post-stage is maximized.

For the adaptive compensation of the transfer characteristic, the minimum square deviation with respect to a signal after the decision may be applied. It may be permitted to fixedly set correction information obtained from impulse responses previously measured, and the like. At this time, by making the sampling rate of the A/D converter twice or more as in the embodiment so that the digital signal satisfies the Nyquist theorem, it becomes possible to obtain good equalization characteristic by the FEE circuit 352.

In the fourth embodiment, a re-sampling circuit 332-1 performs ½ times re-sampling and the other re-sampling circuit 332-2 performs one time re-sampling. This is because the phase component is limited according to the reconstructed interval Td (Td=T in the fourth embodiment), but there is no limitation for the amplitude component. After that, for example, two-times over-sampling may be performed on the phase component having been reconstructed in the field processing unit 111 so as to adjust both sampling rates. In this case, there is an advantage that information dropouts of the amplitude component are reduced.

In the fourth embodiment, the digital information signal obtained by the decision-feedback equalizer 334 is input to an error correction circuit 344 and error correction processing is performed based on the FEC information previously written in the header, thereby improving the transfer characteristics.

Fifth Embodiment

FIG. 12 shows the optical field receiver 100 according to the present invention and an optical transmission system of the fifth embodiment using the optical field receiver. In the fifth embodiment, the optical transmitter 300 generates the transmission optical signal 305 of quaternary phase modulation by applying two groups of binary digital information signals 302-1 and 302-2 to two sets of optical phase modulators 303-1 and 303-2, respectively.

In the optical field receiver 100 of the embodiment, the objects of the present invention can be achieved by using, instead of branching the input optical signal into two optical signal paths, two optical intensity receivers 151-1 and 151-2 connected to the optical delayed detector 104. The electrical signal output from the optical intensity receiver 151-1 (151-2) is sampled by the A/D converter 106-1 (106-2) to convert into digital information, After that, in similar to the fourth embodiment, digital information is waveform-equalized by the feed forward equalizer (FFE) circuit 352-1 (352-2) and input to the field processing unit 111

In the field processing unit 111, a signal $((r(n)r(n-1)\sin(\Delta\phi))$ equivalent to the output signal from the balanced type receiving is generated by obtaining the difference of the output signals from the FFE circuits 352-1 and 352-2 by the subtracting circuit 354. Further, an add circuit 353 adds the two signals to obtain an amplitude product $(r(n)r(n-1))$. Accordingly, y signal $\sin(\Delta\phi)$ is obtained by dividing the output signal from the divider 354 with the amplitude product by the divider 313. Hereafter, by performing the same process as the first embodiment, it is possible to reconstruct the phase component of the optical field.

On the other hand, it is possible to obtain r(n) by inputting the amplitude component $r(n)r(n-1)$ to a field amplitude decision circuit 355 and successively dividing the input signal by the previously decided amplitude value $r(n-1)$ in the field amplitude decision circuit 355. In this operation, an initial value r(n) is necessary. The initial value can be specified, for example, by applying a known specific pattern to the header portion of optical signal or estimating it according to learning. In this type of successive division, the calculation error accumulates easily. In order to prevent the amplitude value from having a large error, it is preferable to perform feedback compensation so as to maintain the amplitude in a proper value at any time, for example, by using decision feedback.

Although the configuration of the embodiment seems to be similar to the configuration of Non-Patent Document 4 at a glance, the present invention is based on the phase detection, while Non-Patent Document 4 is based on the frequency detection. Accordingly, the principle, operation, characteristics, and the range of the parameter with respect to the field reconstruction are different substantially.

For example, in the configuration of FIG. 12, a circuitry, such as the amplitude estimation circuit 355, and the like, is needed in order to estimate the amplitude information of the received optical signal. Further, in the case where a signal of the same symbol rate (for example, 10 Gsymbol/sec) is received, the delay amount Td necessary to optical interferometer (optical delayed circuit) is 5 ps in Non-Patent Document 4, but 50 ps in the present invention, which is about 10 times the value of former. As having been described, there is an apparent difference even in the required sampling period.

The fifth embodiment and Non-Patent Document 4 have a large difference in terms of the performance. In the embodiment, since the phase is compared successively, detection precision of the phase rotation amount is high and it is applicable to the quaternary phase modulation, etc. On the other hand, as the phase rotation amount of the time Td is limited to $\pm\pi/2$, the embodiment has restriction that does not appear in Non-Patent Document 4. As a result, the optical field receiver 100 of the embodiment involves special restriction, such as combining with the phase modulation limiting the phase rotation amount at the transmitting side.

Sixth Embodiment

FIG. 13 shows the sixth embodiment of a wavelength multiplexing optical transmission system to which the optical field receiver according to the present invention is applied.

A wavelength multiplexing transmission equipment 220A includes optical transmitters 226-1A to 226-3A connected to a wavelength division multiplexer 223A and optical field receivers 200-1A to 200-3A according to the present invention, which are connected to a wavelength division demultiplexer 224A. Further, a wavelength multiplexing transmission equipment 220B includes optical transmitters 226-1B to 226-3B connected to a wavelength division multiplexer 223B and optical field receivers 200-1B to 200-3B according to the present invention, which are connected to a wavelength division demultiplexer 224B.

The wavelength multiplexing transmission equipment 220A and 220B are connected to each other by an upstream optical transmission line and a downstream optical transmission line. The upstream optical transmission line includes optical fibers 206-1 to 206-3 and optical amplifiers 225-1 and 225-2, and the downstream optical transmission line includes optical fibers 206-4 to 206-6 and optical amplifiers 225-3 and 225-4.

The optical transmitters 226-1A to 226-3A of the wavelength multiplexing transmission equipment 220A transmit optical signals at different wavelengths $\lambda 1$ to $\lambda 3$, respectively. These optical signals are multiplexed by the wavelength division multiplexer 223A, output to the upstream optical transmission line, demultiplexed for each wavelength by the wavelength division demultiplexer 224B of the opposing optical transmission equipment 220B and input to the optical field receivers 200-1B to 200-3B. On the other hand, the optical transmitters 226-1B to 226-3B of the wavelength multiplexing transmission equipment 220B transmit optical signals at different wavelengths $\lambda 1$ to $\lambda 3$, respectively. These optical signals are multiplexed by the wavelength division multiplexer 223B, output to the downstream optical transmission line, demultiplexed for each wavelength by the wavelength division demultiplexer 224A of the optical transmission equipment 220A, and input to the optical field receivers 200-1A to 200-3A. The optical wavelengths to be multiplexed may be different on the upstream transmission line and the downstream optical transmission line.

The wavelength multiplexing transmission equipment 220A (220B) is provided with a node controller 221A (221B) and a database 222A (222B). Although the optical transmitters 226-1A to 2226-3A (226-1B to 226-3B) and the optical field receivers 200-1A to 200-3A (200-1B to 200-3B) receives transmission data from the outside and outputs received data to the outside, it is omitted in the drawings. The data base 222A (222B) stores a data table showing the chromatic dispersion quantity of each optical fiber that forms the optical transmission line corresponding to the received wavelengths $\lambda 1$ to $\lambda 3$.

FIG. 14 shows a flow chart of a compensation quantity setting routine to be executed in the node controller 221A (221B). The routine is executed when starting and resetting the wavelength multiplexing transmission equipment or resetting the transmitter and receiver 226 (226-1A to 226-3A) and 200 (200-1A to 200-3A).

The node controller 221A reads out the chromatic dispersion quantity data table from the database 222A and sets parameter i for specifying a wavelength channel to an initial value "1" (step 601). The node controller 221A checks the value of parameter i (step 602) and if the parameter i exceeds the number N (N=3 in FIG. 21) of channels that are multiplexed in the optical fiber transmission line, ends this routine.

When the parameter i is equal to or less than N, the node controller 221A calculates a total of chromatic dispersion quantity Di of the whole optical fiber along the receiving optical transmission line (a downstream optical transmission line in the case of the node controller 221-1) from the chromatic dispersion quantity of each optical fiber corresponding to the wavelength $\lambda i$ of the i-th channel indicated by the chromatic dispersion quantity data table (step 603). Thereafter, the node controller 221A sets the compensation quantity "$-D_i$" to a terminal 207 of the optical field receiver 200-$i$A of i-th channel (wavelength $\lambda_i$) and starts the optical field receiver 200-$i$A. The node controller 221A increments the value of parameter i to (i=i±1), so that steps 602 to 604 are repeated until the parameter i exceeds the multiplexed the number N of the channels.

According to the embodiment, each of optical field receivers 200-1A to 200-3A does not need the adaptive control because it can estimate the chromatic dispersion compensation quantity with high precision when it was started. In contrast, even when the adaptive control is used, it is possible to transit to an optimal control state in a short time and to prevent the malfunction.

Seventh Embodiment

FIG. 15 shows an embodiment of an optical network that includes plural optical add drop multiplexers (ADMs) 230-1 to 230-4 using the optical field receiver according to the present invention. The optical add-drop multiplexers 230-1 to 230-4 are connected in a ring shape through optical fiber transmission lines 206-1 to 206-4.

In the optical network using the optical add-drop multiplexers or optical cross-connects, there is possibility that the optical signal path is dynamically changed. In the eleventh embodiment, when the optical signal path is changed, the dispersion compensation quantity in the optical receiver 200 affected by the path change is optimized by the control console 231 connected to the optical add-drop multiplexer 230-1. Reference numeral 222 represents a database 222 that records the chromatic dispersion value for each wavelength over the whole optical fiber composing the network. When the optical signal path is changed, the control console 231 accesses the database 222 to calculate a total chromatic dispersion value according to a new optical signal path and a wavelength being used, and delivers the calculated total chromatic dispersion value, as the chromatic compensation quantity, to the optical receiver 200 (200-1 to 200-3) connected to the optical add drop multiplexer (230-2 to 230-4) that is an end of the new path, via a network.

For example, in FIG. 15, the optical signal of wavelength $\lambda 3$ output from the optical transmitter 200-3 is input to the optical add drop multiplexer 230-4 and reaches the optical field receiver 200-3, which is connected to the optical add-drop multiplexer 230-3, through three optical fiber transmission lines 206-1 to 206-3 along the optical path 232-3. If the optical path 232-3 is a new path, the control console 231 reads out the chromatic dispersion quantity of the optical fiber transmission lines 206-1 to 206-3 corresponding to the wavelength λ3 from the database 222 and informs the optical field receiver 200-3 of the setting signal indicating the compensation quantity decided from the sum of the chromatic dispersion quantity, through a communication path 233-3 shown by a dotted line. The compensation quantity setting signal is input to the compensation quantity setting terminal 207-3, such that the optimal dispersion compensation value is set to the field compensator 202 of the optical field receiver 200-3.

According to the eleventh embodiment, even when the optical path is switched on the optical network, since the optimal compensation quantity can be instantly set from the control console to the optical field receiver 200-3 that is an end of the optical path, the stop time of communication can be shorten remarkably. If the precision of the dispersion compensation value having been set from the control console is not sufficient, the value may be optimized by the adaptive control, using the setting value as an initial value.

INDUSTRIAL APPLICABILITY

The present invention is applicable to compensation for the degradation in reception and transmission of the intensity modulation signal or the binary phase modulation signal and compensation for the degradation in reception and transmission of the multilevel modulation signal in the optical communication field.

BRIEF DESCRIPTION OF THE DRAWINGS

FIGS. 1A-E are views for explaining modulation schemes that can be applied to optical transmission;

FIG. 4 shows a configuration (A) of an optical transmission system according to the first embodiment of the present invention, constellation (B) of phase modulation light, and a phase waveform (C) of the phase modulation light;

EXPLANATION OF REFERENCE NUMERALS AND SYMBOLS

Figure 2A:
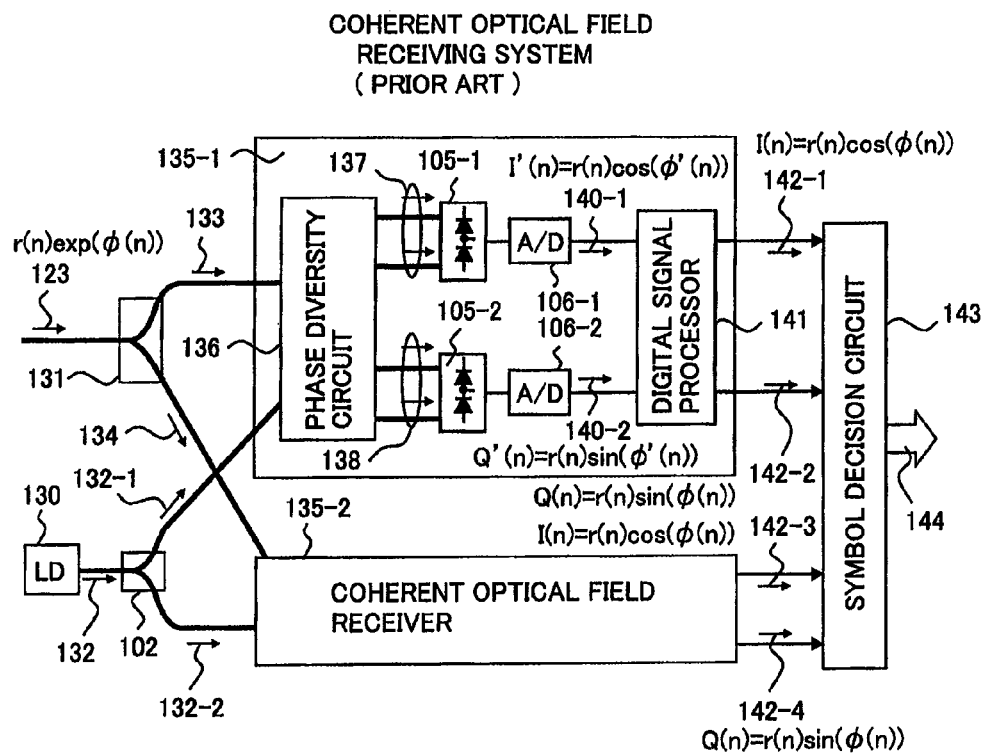
FIG. 2 is a configuration view (A) showing one example of a coherent optical field receiver according to the prior art, and a view (B) showing the influence of phase fluctuation.
Figure 2B:
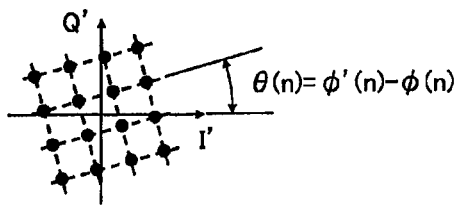
Figure 3A:
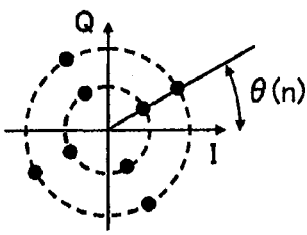
FIG. 3 shows constellation (A) of an 8-level amplitude and phase shift keying (APSK) signal, and a configuration view (B) of an optical multilevel signal receiver for receiving an 8 APSK signal according to the prior art.
Figure 3B:
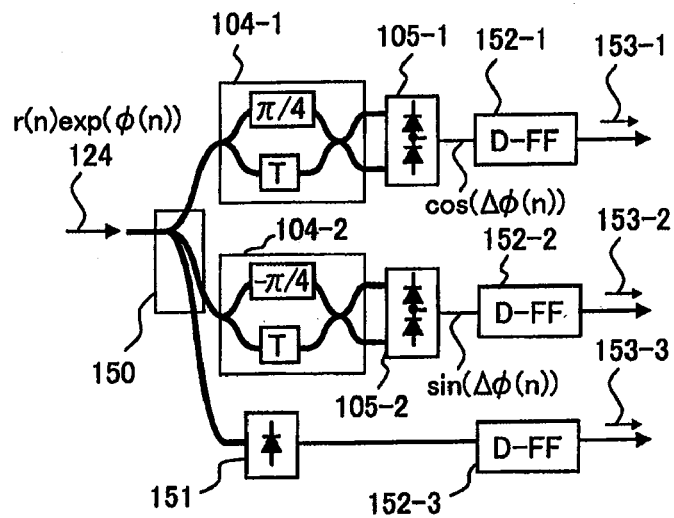
Figure 5A:
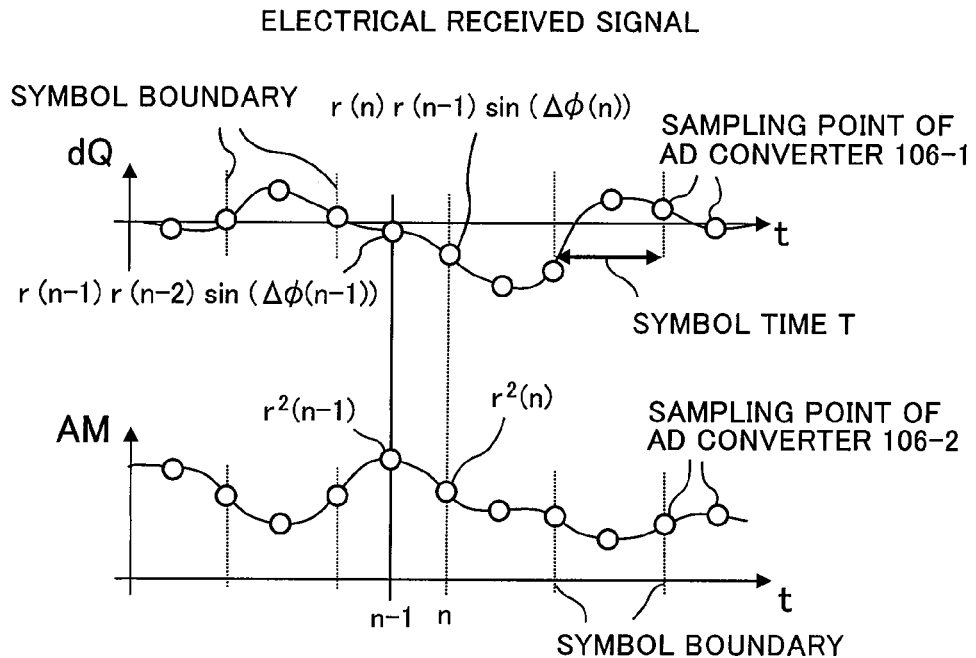
FIG. 5 shows a view of change in an electrical received signal (A) and a view of change in a reconstructed field signal (B) in the first embodiment.
Figure 5B:
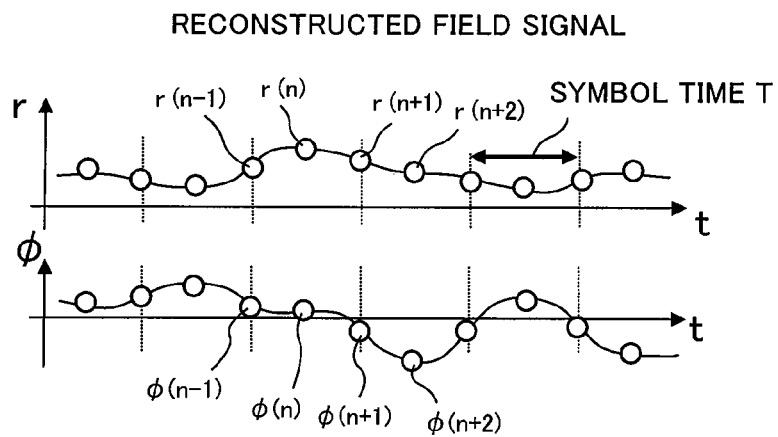
Figure 6A:
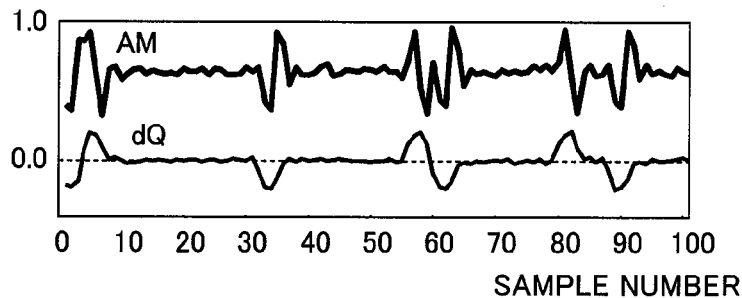
FIG. 6 is experimental results of the first embodiment and shows a reception electrical waveform (A), an equivalent optical field waveform (B) formed by reconstructing and compensating for the reception waveform in an electrical region, an intensity waveform (C) after reconstruction, an optical field waveform (D) after the reconstruction, a delayed detection waveform (E) after the reconstruction, an intensity waveform (F) after dispersion compensation, an optical field waveform (G) after the dispersion compensation, and a delayed detection waveform (H) after the dispersion compensation.
Figure 6B:
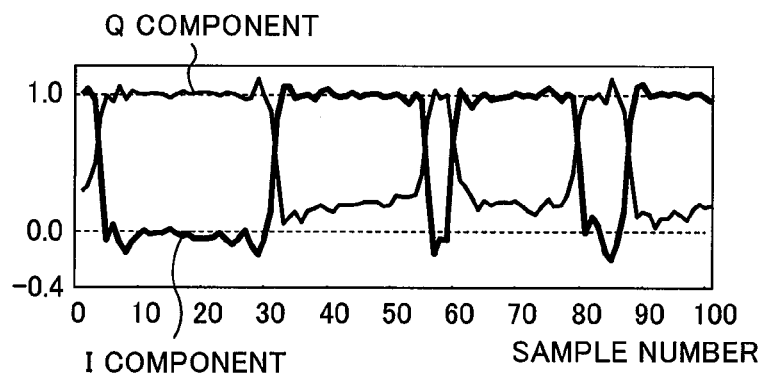
Figure 6C:
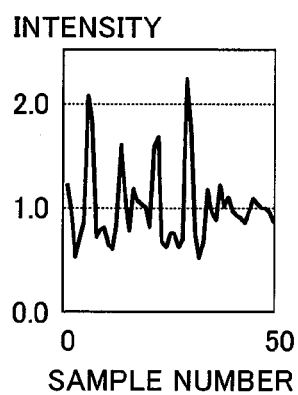
Figure 6D:
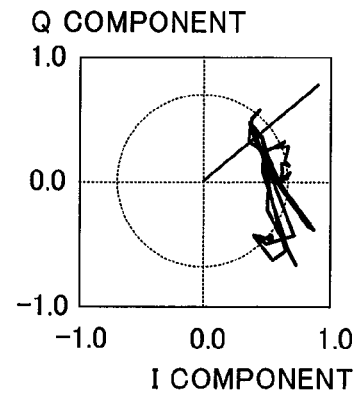
Figure 6E:
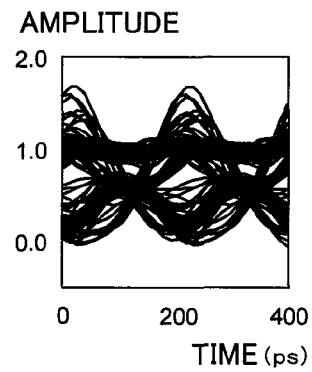
Figure 6F:
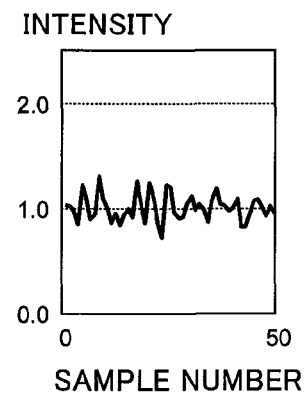
Figure 6G:
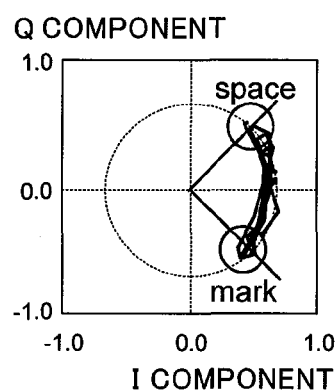
Figure 6H:
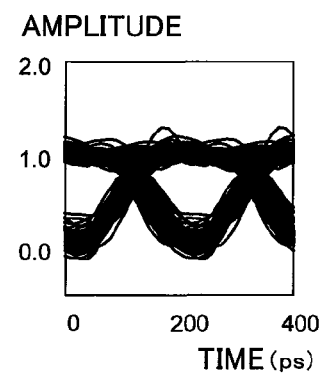
Figure 7A:
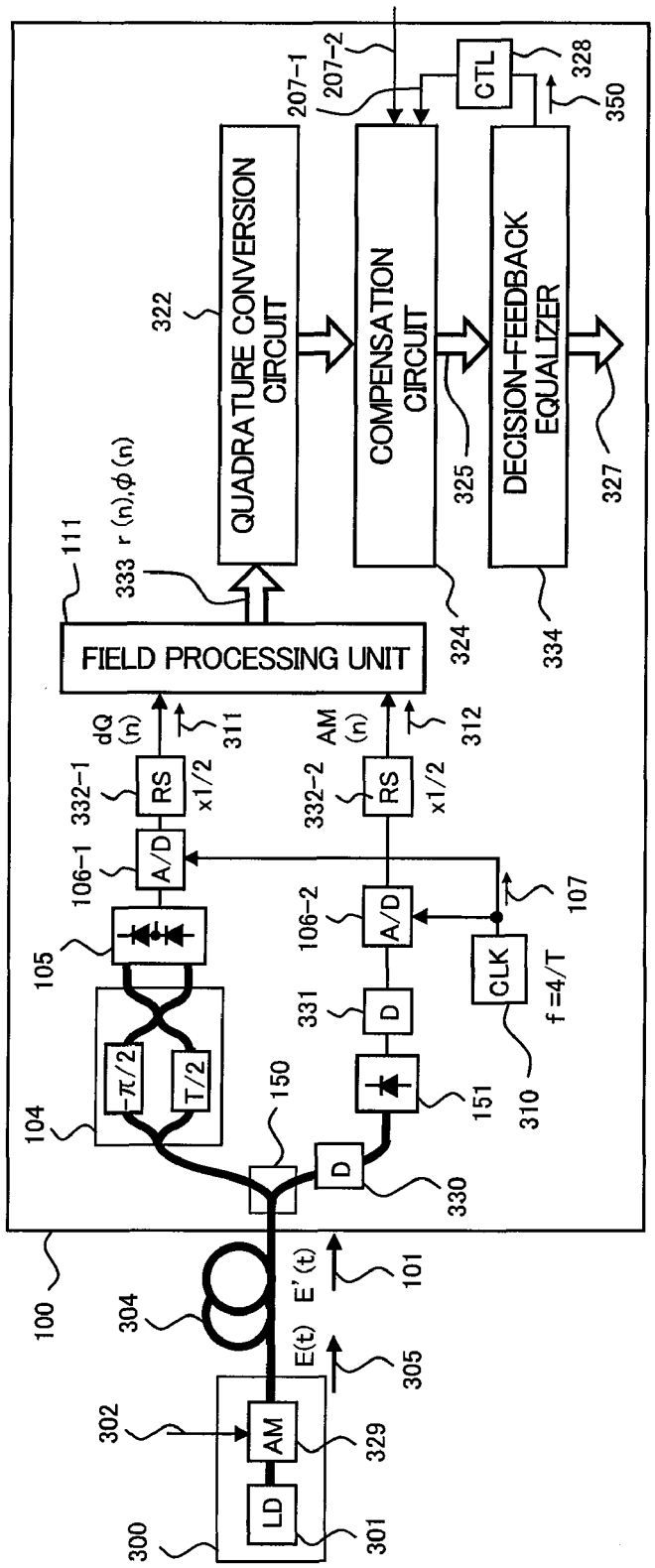
FIG. 7 shows a configuration (A) of an optical field system according to the second embodiment of the present invention, signal constellation (B) of transmission light and signal constellation (C) of transmission light.
Figure 7B:
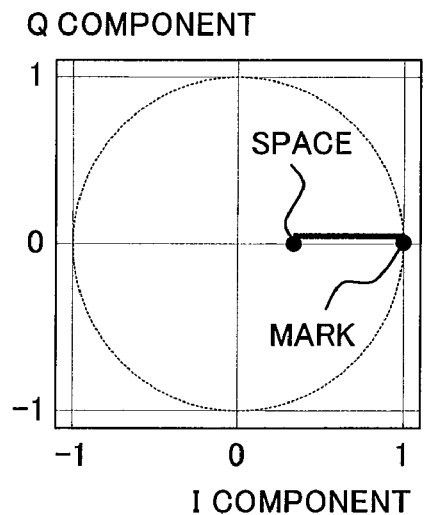
Figure 7C:
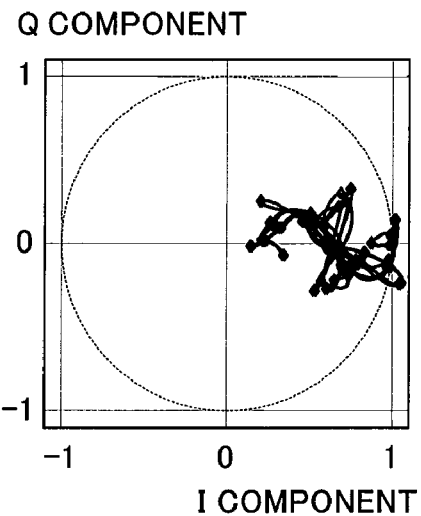
Figure 8A:
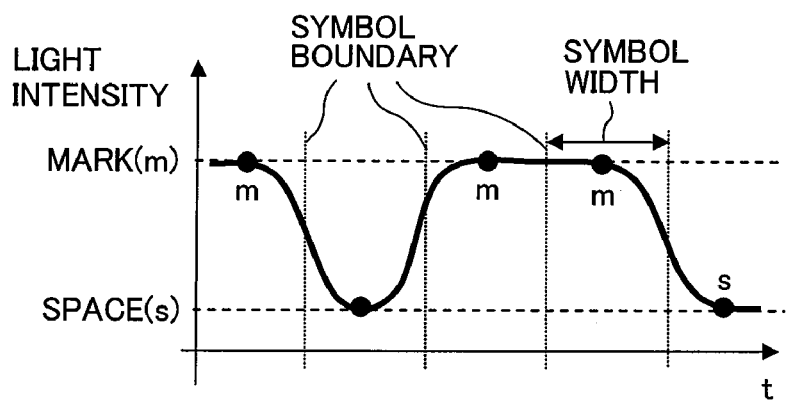
FIG. 8 shows a transmission optical intensity waveform (A), a reception waveform (B) and an appearance of sampling (C) according to the second embodiment.
Figure 8B:
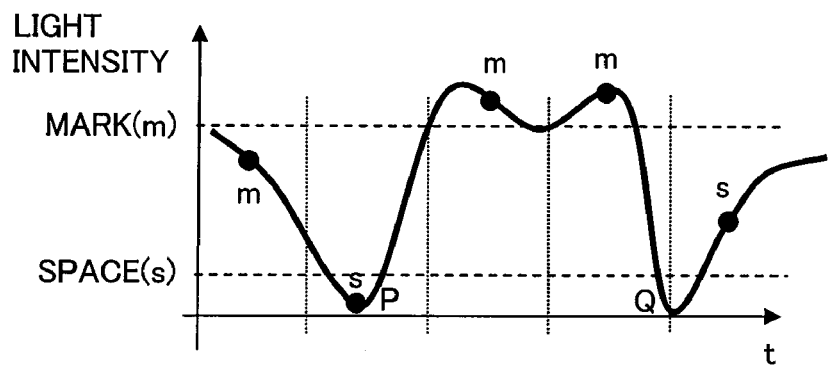
Figure 8C:
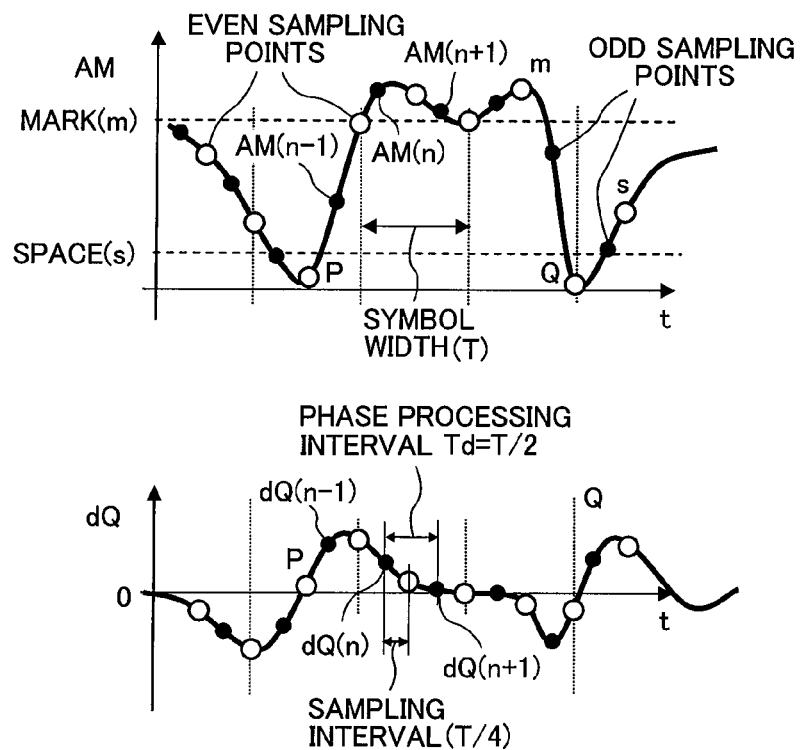
Figure 9A:
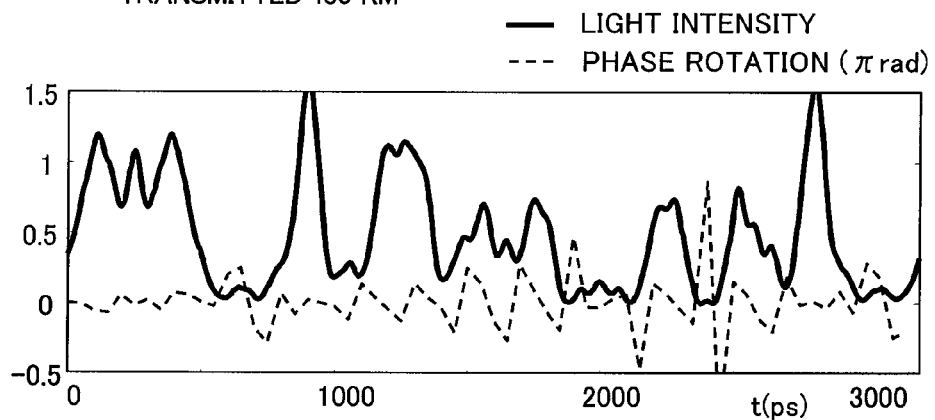
FIG. 9 is views showing verification results of application range of the present invention, and for explaining a waveform and a phase rotation amount (A) after transmitting optical intensity modulation light (α=1) through a fiber, minimum optical intensity and a maximum phase rotation amount (B) after the transmission in the case of α=1, and minimum optical intensity and a maximum phase rotation amount (C) after the transmission in the case of α=0.
Figure 9B:
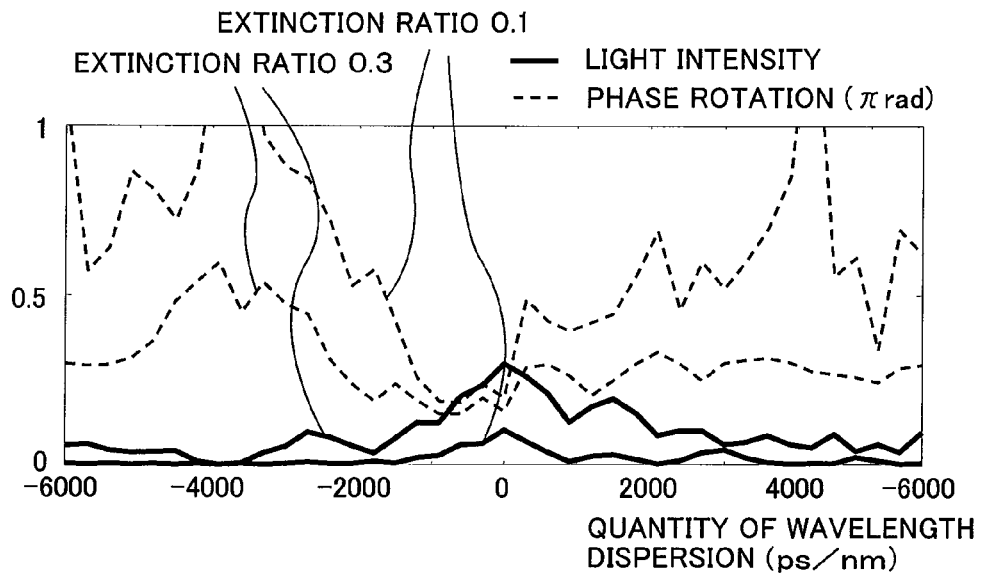
Figure 9C:
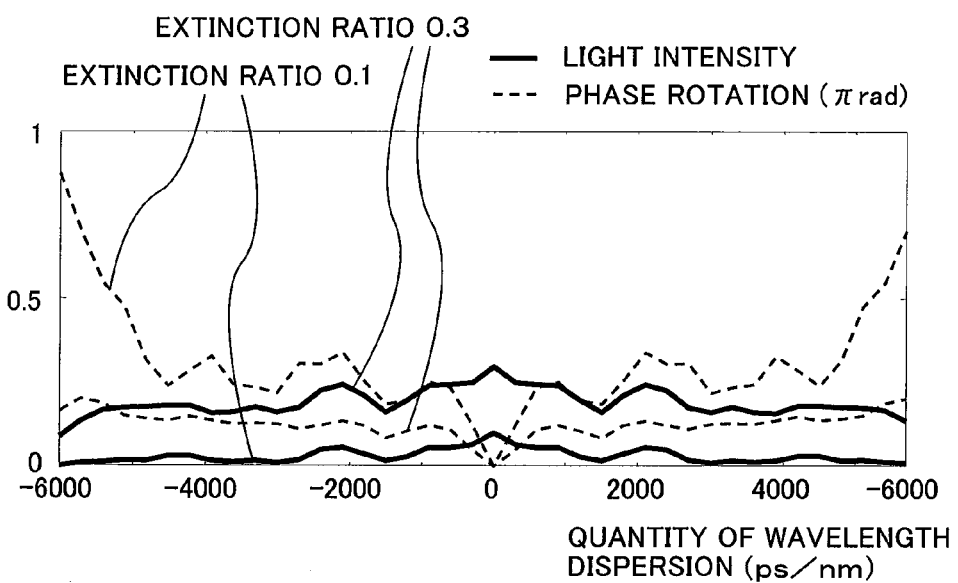
Figure 10A:
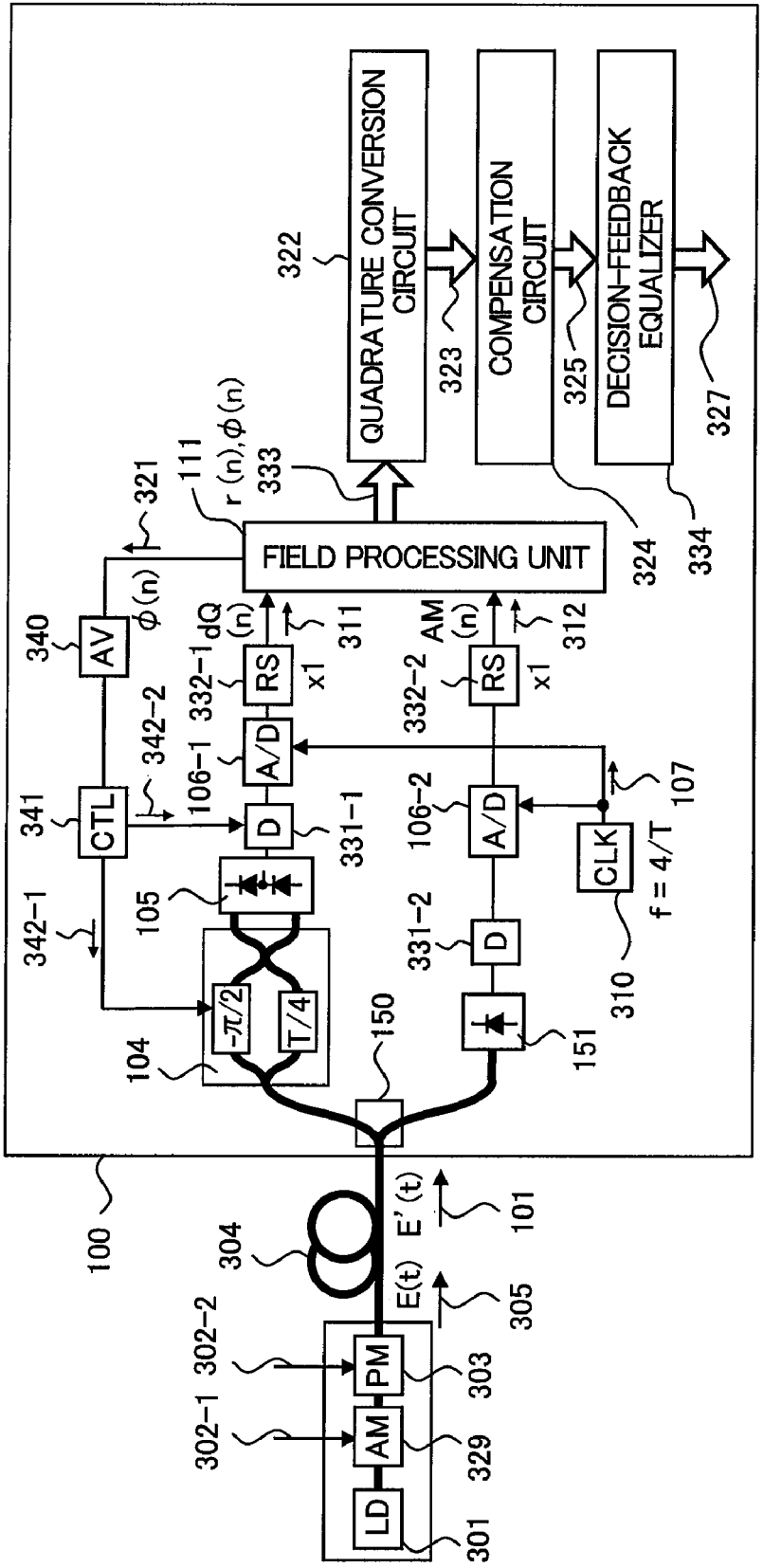
FIG. 10 shows a configuration (A) of an optical transmission system of the third embodiment using the optical field receiver according to the present invention, and signal constellations (B), (C) and (D) of quaternary transmission optical signal used in the third embodiment.
Figure 10B:
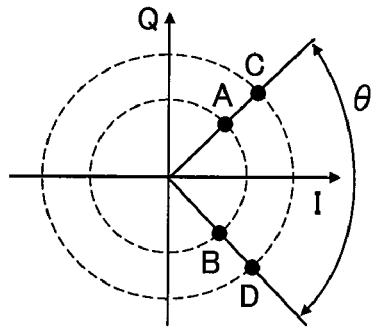
Figure 10C:
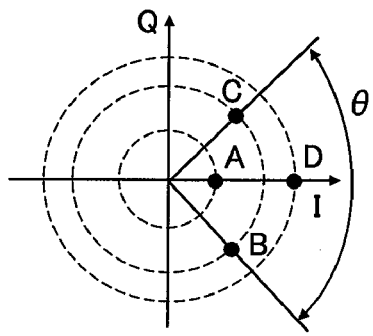
Figure 10D:
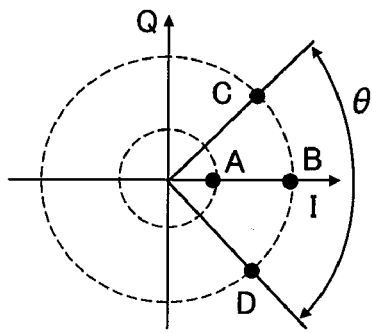
Figure 11A:
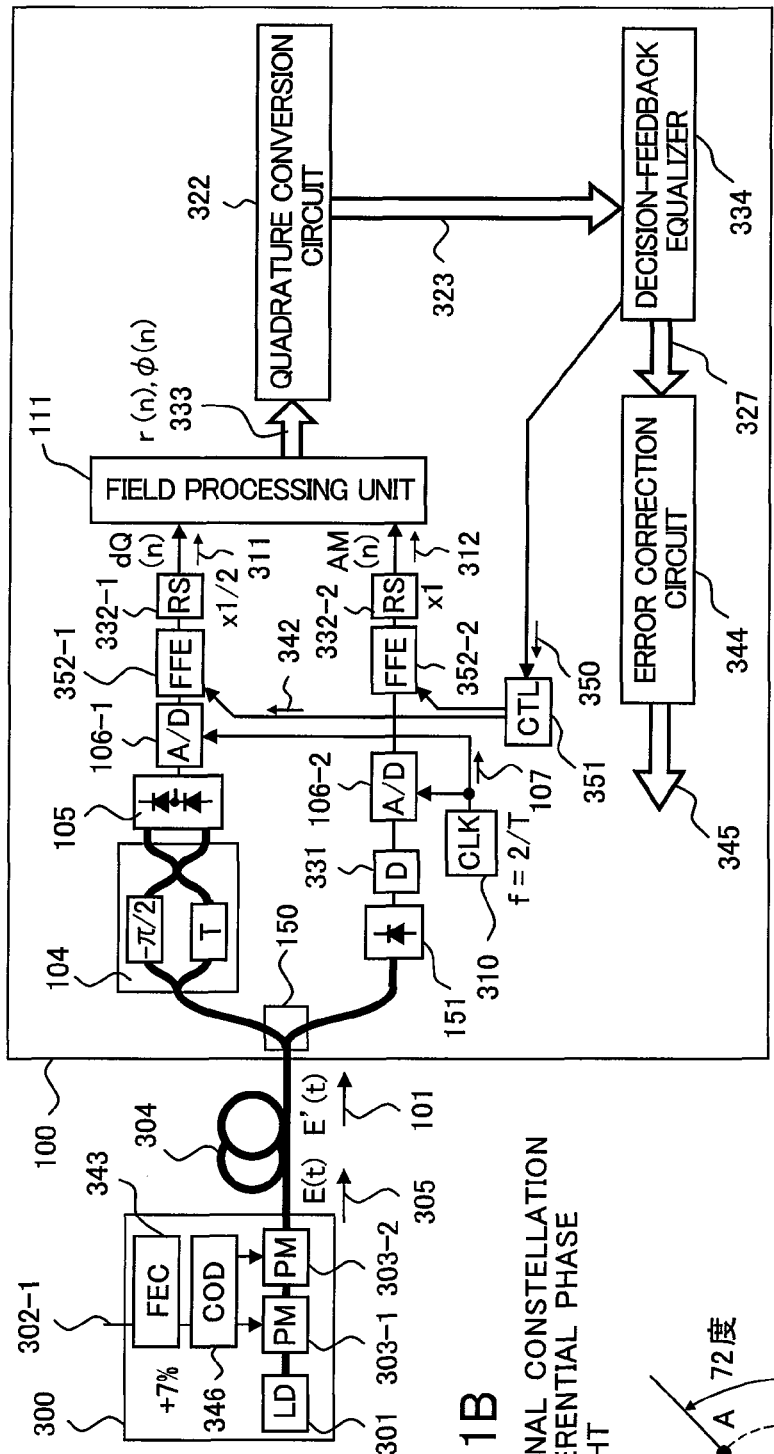
FIG. 11 shows a configuration (A) of an optical transmission system of the fourth embodiment using the optical field receiver according to the present invention and a signal constellation (B) of ternary transmission light signal used in the embodiment.
Figure 11B:
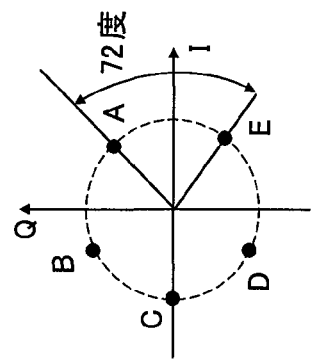
Figure 12:
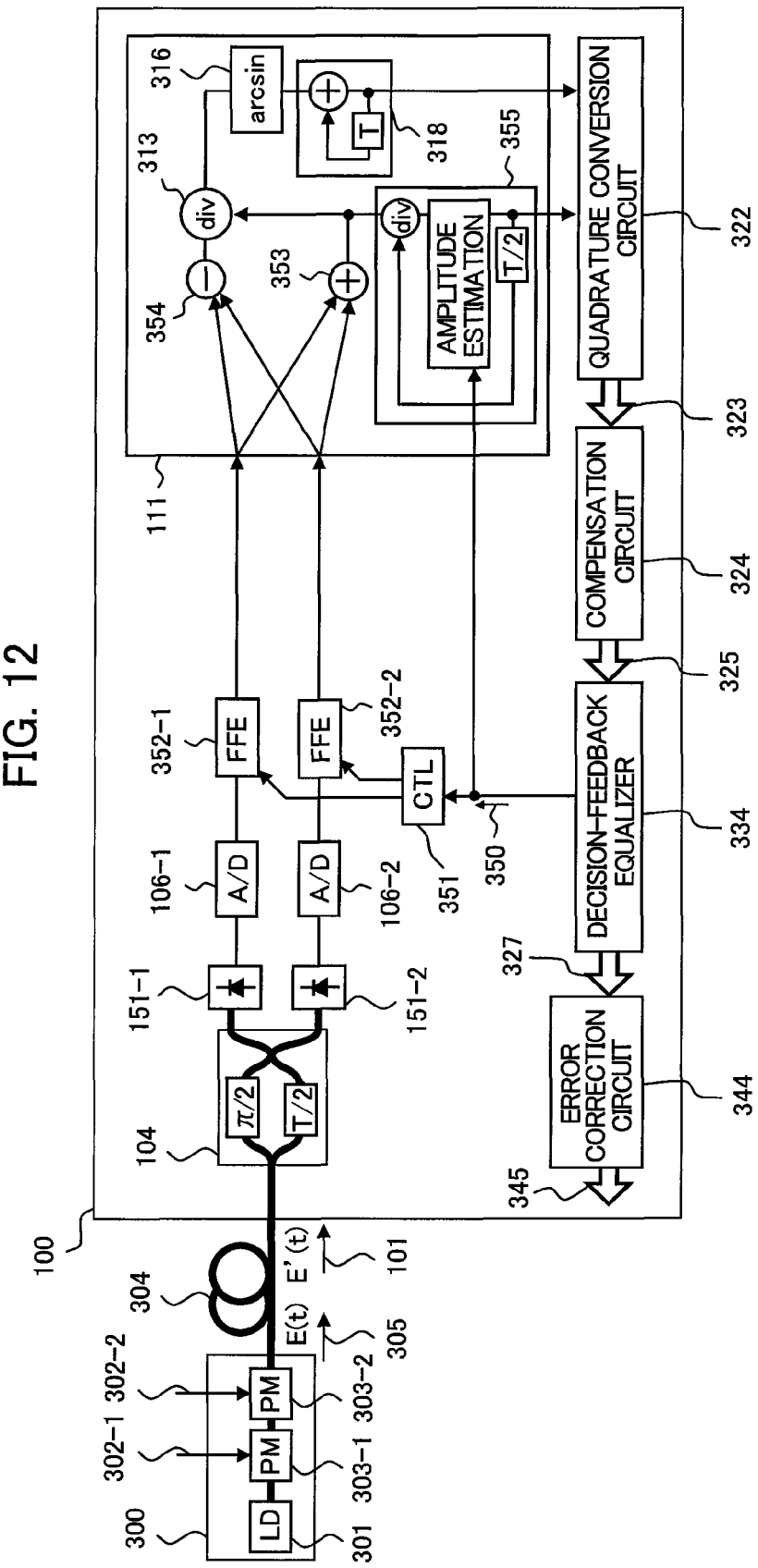
FIG. 12 is a view showing a configuration of an optical transmission system of the fifth embodiment using the optical field receiver according to the present invention.
Figure 13:
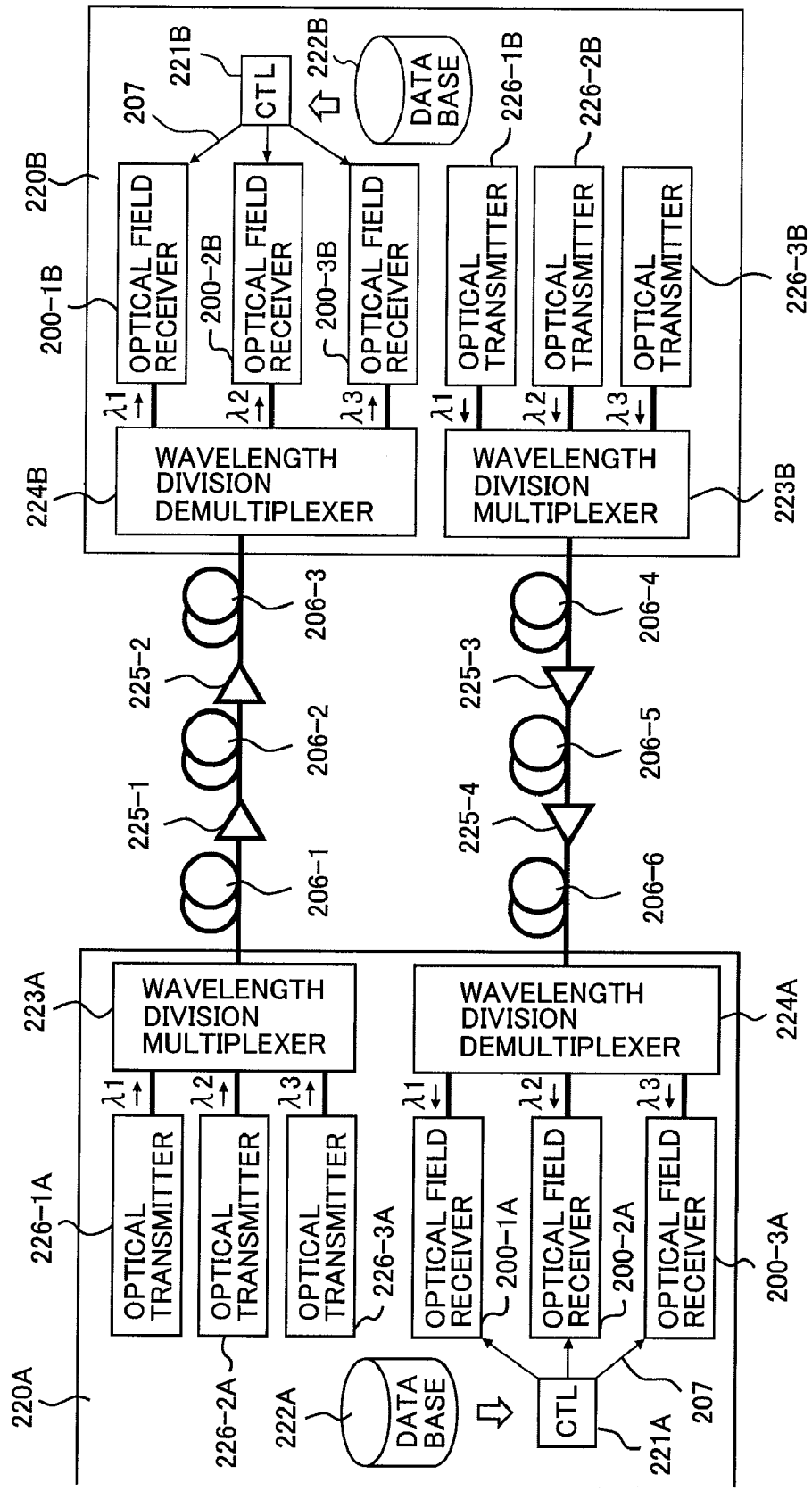
FIG. 13 is a view showing a configuration of a wavelength multiplexing optical transmission system of the sixth embodiment using the optical field receiver according to the present invention.
Figure 14:
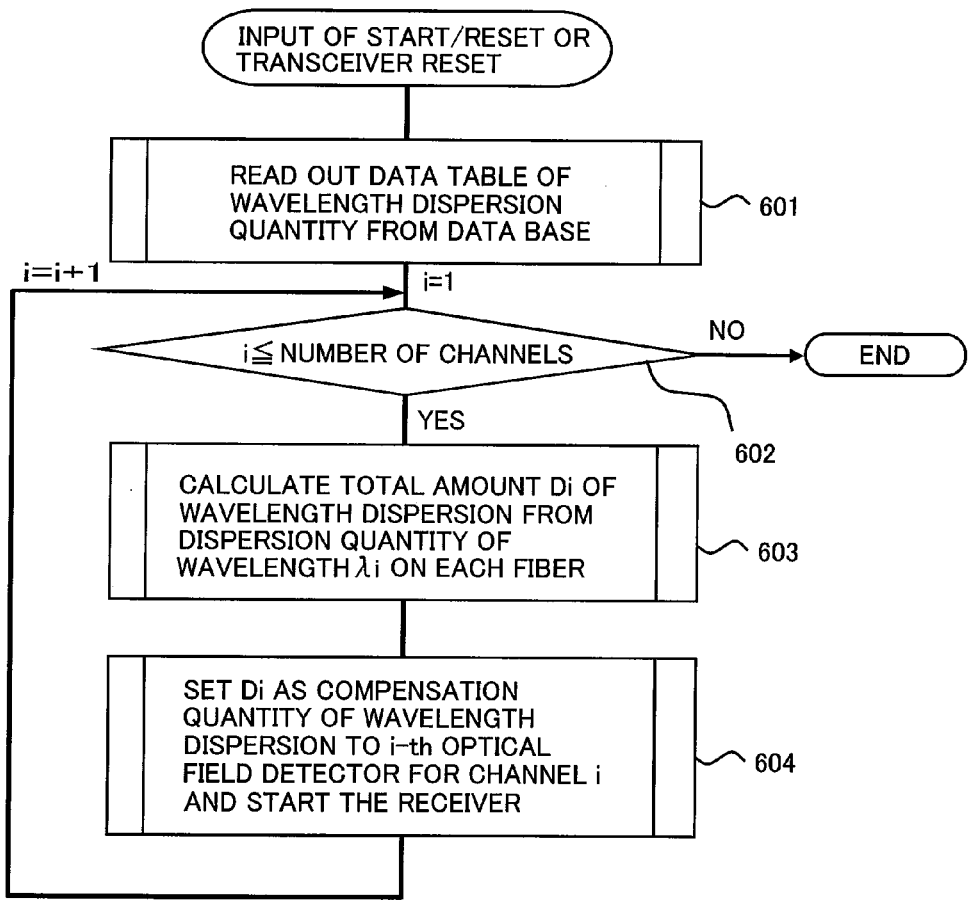
FIG. 14 is a flow chart of a compensation amount setting routine to be performed by a node controller in FIG. 13.
Figure 15:
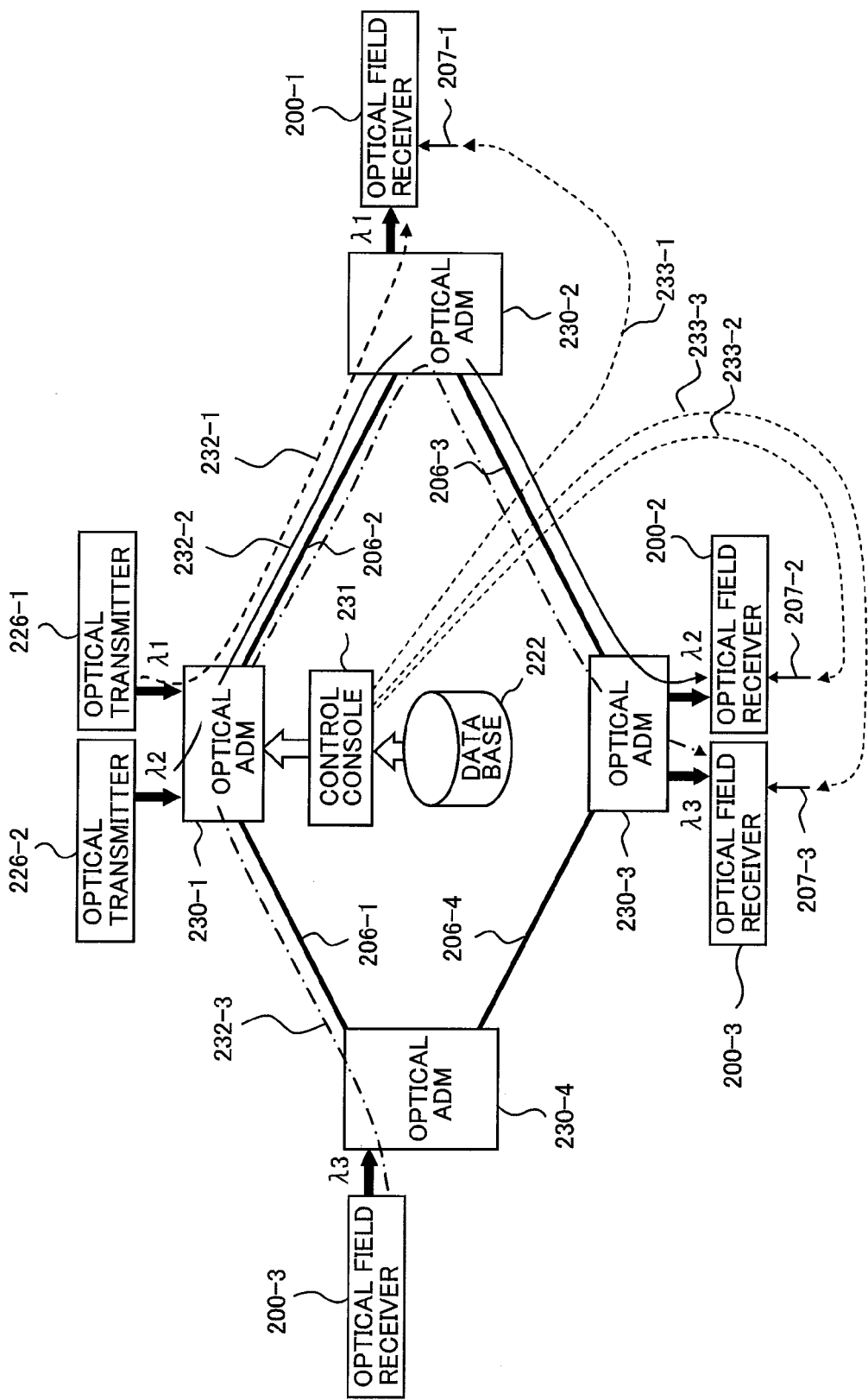
FIG. 15 is a view showing a configuration of an optical network of the seventh embodiment including a plurality of ADMs using the optical field receiver according to the present invention.

100: OPTICAL FIELD RECEIVER
101: INPUT OPTICAL SIGNAL
102: OPTICAL BRANCHING CIRCUIT
103: OPTICAL SIGNAL PATH
104: OPTICAL DELAYED DETECTOR
105: BALANCED OPTICAL RECEIVER
106: A/D CONVERTER
107: SAMPLING CLOCK SIGNAL
108: DELAY ADJUSTING CIRCUIT
109: ELECTRIC SIGNAL PATH
111: FIELD PROCESSING UNIT
112: SQUARE ROOT PROCESSOR
113: INVERSE TANGENT CIRCUIT
115: DELAYED DIVIDER
116: DELAYED ADDER
117: RECONSTRUCTED OPTICAL FIELD SIGNAL
120: PACKET SEGMENTING CIRCUIT
121: PACKET ASSEMBLING CIRCUIT
123: OPTICAL MULTILEVEL SIGNAL
124: OPTICAL APSK SIGNAL
130: LOCAL LASER
131: POLARIZATION SPLITTER
132: LOCAL LIGHT
133: P POLARIZATION COMPONENT OF OPTICAL MULTILEVEL SIGNAL
134: S POLARIZATION COMPONENT OF OPTICAL MULTILEVEL SIGNAL
136: PHASE DIVERSITY CIRCUIT
137: I COMPONENT OUTPUT LIGHT
138: Q COMPONENT OUTPUT LIGHT
141: DIGITAL SIGNAL PROCESSOR
143: SYMBOL DECISION CIRCUIT
144: RECONSTRUCTED MULTILEVEL DIGITAL SIGNAL

150: OPTICAL BRANCHING CIRCUIT
151: OPTICAL INTENSITY RECEIVER
152: BINARY DECISION CIRCUIT
153: BINARY RECONSTRUCTED DIGITAL SIGNAL
300: OPTICAL TRANSMITTER OF THE PRESENT INVENTION
301: LASER
302: BINARY DIGITAL INFORMATION SIGNAL
303: OPTICAL PHASE MODULATOR
304: FIBER LINK
305: TRANSMISSION OPTICAL SIGNAL
310: CLOCK OSCILLATOR
311: DQ SIGNAL
312: AM SIGNAL
313: DIVIDER
314: DELAY CIRCUIT
315: Y SIGNAL
316: ARC SIN OPERATION CIRCUIT
317: PHASE DIFFERENCE SIGNAL (Δφ)
318: DELAY ADDING CIRCUIT
320: AMPLITUDE OF RECONSTRUCTED OPTICAL FIELD
321: PHASE OF RECONSTRUCTED OPTICAL FIELD
322: QUADRATURE CONVERSION CIRCUIT
323: RECEIVED OPTICAL SIGNAL (QUADRATURE COORDINATE REPRESENTATION)
324: COMPENSATION OPERATION CIRCUIT
325: FIELD SIGNAL AFTER COMPENSATION
326: DEMODULATION/DECISION CIRCUIT
327: DIGITAL INFORMATION SIGNAL
328: COMPENSATION AMOUNT OPTIMIZATION CIRCUIT
329: OPTICAL INTENSITY MODULATOR
330: TUNABLE OPTICAL DELAY CIRCUIT
331: TUNABLE HIGH FREQUENCY DELAY CIRCUIT
322: RE-SAMPLING CIRCUIT
333: RECONSTRUCTION OPTICAL FIELD (POLAR COORDINATE REPRESENTATION)
334: DECISION-FEEDBACK EQUALIZER
340: AVERAGE CIRCUIT
341: AUTOMATIC CONTROL CIRCUIT
342: CONTROL SIGNAL
343: ERROR CORRECTION CODE ADDITIONAL CIRCUIT
344: ERROR CORRECTION CIRCUIT
345: DIGITAL INFORMATION SIGNAL AFTER ERROR CORRECTION
346: DIFFERENTIAL ENCODING CIRCUIT
350: EYE-OPENING AMOUNT
351: MINIMUM SQUARE CONTROL CIRCUIT
352: FEED FORWARD EQUALIZER (FEE) CIRCUIT
353: ADDING CIRCUIT
354: SUBTRACTING CIRCUIT
355: FIELD AMPLITUDE DECISION CIRCUIT
200: OPTICAL FIELD RECEIVER
206: FIBER LINK
207: COMPENSATION AMOUNT INPUT TERMINAL
220: OPTICAL WAVELENGTH MULTIPLEXING TRANSMISSION EQUIPMENT
221: NODE CONTROLLER
222: DATABASE
223: WAVELENGTH MULTIPLEXER
224: WAVELENGTH DEMULTIPLEXER
225: OPTICAL AMPLIFIER
226: OPTICAL TRANSMITTER OF THE PRESENT INVENTION
230: OPTICAL ADD DROP EQUIPMENT
231: control console
232: PATH OF OPTICAL SIGNAL
233: COMMUNICATION PATH OF COMPENSATION AMOUNT SETTING SIGNAL

The invention claimed is:

1. An optical field receiver for receiving an optical signal modulated with an information signal of symbol rate R, comprising:
   an optical brancher for branching the received optical signal into first and second optical signals;
   an optical delayed detector for performing delayed detection on the first optical signal at a delay time Td and shifting a phase of the first optical signal by +90° or −90°;
   a first optical receiver for receiving the first optical signal output from the optical delayed detector and converting the first optical signal into a first electrical signal;
   a second optical receiver for receiving the second optical signal and converting the second optical signal into a second electrical signal; and
   an operation circuit for calculating the amplitude and phase of optical field of the received optical signal or in-phase component and quadrature component of the optical field, from the first and second electrical signals,
   wherein a delay time Td of the optical delayed detector is $Td \geq 1/(5R)$, and
   a propagation time difference of the first and second optical signals from the optical brancher to the operation circuit is equal to or less than the delay time Td.

2. The optical field receiver according to claim 1, wherein the first optical receiver is a balanced optical receiver.

3. The optical field receiver according to claim 1, wherein the operation circuit calculates the phase of the received optical signal by normalizing amplitude dQ(t) of the first optical signal output from the first optical receiver by dividing the amplitude dQ(t) by an amount (sqrt(AM(t))·sqrt(AM(t−T)) obtained from amplitude AM(t) of the second optical signal output from the second optical receiver and amplitude AM(t−T) of the second optical signal preceding by time T than the amplitude AM(t) and performing arc sine operation.

4. An optical field receiver for receiving an optical signal modulated with an information signal of symbol rate R, comprising:
   an optical brancher for branching the received optical signal into first and second optical signals;
   an optical delayed detector for performing delayed detection on the first optical signal at a delay time Td and shifting a phase of the first optical signal by +90° or −90°;
   a first optical receiver for receiving the first optical signal output from the optical delayed detector and converting the first optical signal into a first electrical signal;
   a second optical receiver for receiving the second optical signal and converting the second optical signal into a second electrical signal; and
   an operation circuit for calculating the amplitude and phase of optical field of the received optical signal or in-phase component and quadrature component of the optical field, from a difference component and a sum component of the first and second electrical signals,
   wherein the delay time Td of the optical delayed detector is $Td \geq 1/(5R)$, and
   a propagation time difference of the first and second optical signals from the optical brancher to the operation circuit is equal to or less than the delay time Td.

5. The optical field receiver according to claim 1, further comprising:

A/D converters for converting the first and second optical signals received by the first and second receivers into digital signals, wherein a sampling time Tsa of the A/D converters is equal to or less than 2Td, and the operation circuit is configured by any one of a digital operation circuit, an IC circuit, and a computer program.

6. The optical field receiver according to claim 1, further comprising:

an optical field compensation circuit for performing inverse operation of propagation characteristics of a transmission line of the optical signal on information signal of the amplitude and phase or information signal of the in-phase component and the quadrature component of the optical field of the optical signals calculated by the operation circuit; and means for automatically controlling a compensation amount of the optical field compensation circuit so as to make the compensation amount constant or the received state of the optical signal optimal.

7. The optical field receiver according to claim 1 further comprising:

an optical field compensation circuit for performing inverse operation of propagation characteristics of a transmission line of the optical signal on information signal of the amplitude and phase or information signal of the in-phase component and the quadrature component of the optical field of the optical signals calculated by the operation circuit; and means for setting a compensation amount, a compensation algorithm, or initial setting values of the optical field compensation circuit from the outside.

8. The optical field receiver according to claim 6, wherein the optical field compensation circuit compensates for at least one of a wavelength dispersion characteristic, a high-order wavelength dispersion characteristic, an optical fiber non-linear effect, and wavelength band limitation of the transmission line, among the propagation characteristics of the transmission line of the optical signal.

9. The optical field receiver according to claim 2, further comprising means for controlling in stable the phase amount of the optical delayed detector, the length of transmission line of at least one of the first and second optical signals, the phase of at least one of the first and second electrical signals, an offset amount, gain, linearity or non-linearity of the electrical signal, or coefficients of an adaptive compensation circuit so as to make the time average value of the output signals from the first and second optical receiver zero, the waveform of field signal reconstructed from amplitude and a phase or an in-phase component and a quadrature component of the calculated optical field symmetrical in up and down direction, or the time fluctuation of the phase component of the reconstructed field signal minimum.

10. Optical transmission equipment, comprising:

an optical field receiver according to claim 1; and an optical transmitter for transmitting the optical signal modulated with the information signal of symbol rate R, wherein extinction ratio of the modulated optical signals is larger than 0.15, and a phase rotation amount of the optical signal within time Td is equal to or less than 90°.

11. The optical transmission equipment according to claim 10, wherein a modulation scheme of the optical signals is any one of binary optical intensity modulation, binary phase modulation, and multilevel amplitude and phase modulation.

12. The optical field receiver according to claim 7, wherein the optical field compensation circuit compensates for at least one of a wavelength dispersion characteristic, a high-order wavelength dispersion characteristic, an optical fiber non-linear effect, and wavelength band limitation of the transmission line, among the propagation characteristics of the transmission line of the optical signal.

13. The optical field receiver according to claim 4, further comprising:

A/D converters for converting the first and second optical signals received by the first and second receivers into digital signals, wherein a sampling time Tsa of the A/D converters is equal to or less than 2Td, and the operation circuit is configured by any one of a digital operation circuit, an IC circuit, and a computer program.

14. The optical field receiver according to claim 4, further comprising:

an optical field compensation circuit for performing inverse operation of propagation characteristics of a transmission line of the optical signal on information signal of the amplitude and phase or information signal of the in-phase component and the quadrature component of the optical field of the optical signals calculated by the operation circuit; and means for automatically controlling a compensation amount of the optical field compensation circuit so as to make the compensation amount constant or the received state of the optical signal optimal.

15. The optical field receiver according to claim 4, further comprising:

an optical field compensation circuit for performing inverse operation of propagation characteristics of a transmission line of the optical signal on information signal of the amplitude and phase or information signal of the in-phase component and the quadrature component of the optical field of the optical signals calculated by the operation circuit; and means for setting a compensation amount, a compensation algorithm, or initial setting values of the optical field compensation circuit from the outside.

16. The optical field receiver according to claim 4, wherein the optical field compensation circuit compensates for at least one of a wavelength dispersion characteristic, a high-order wavelength dispersion characteristic, an optical fiber non-linear effect, and wavelength band limitation of the transmission line, among the propagation characteristics of the transmission line of the optical signal.

17. The optical field receiver according to claim 4, further comprising means for controlling in stable the phase amount of the optical delayed detector, the length of transmission line of at least one of the first and second optical signals, the phase of at least one of the first and second electrical signals, an offset amount, gain, linearity or non-linearity of the electrical signal, or coefficients of an adaptive compensation circuit so as to make the time average value of the output signals from the first and second optical receiver zero, the waveform of field signal reconstructed from amplitude and a phase or an in-phase component and a quadrature component of the calculated optical field symmetrical in up and down direction, or the time fluctuation of the phase component of the reconstructed field signal minimum.

18. Optical transmission equipment, comprising:

an optical field receiver according to claim 4; and an optical transmitter for transmitting the optical signal modulated with the information signal of symbol rate R, wherein extinction ratio of the modulated optical signals is larger than 0.15, and a phase rotation amount of the optical signal within time Td is equal to or less than 90°.

19. The optical transmission equipment according to claim 4, wherein a modulation scheme of the optical signals is any one of binary optical intensity modulation, binary phase modulation, and multilevel amplitude and phase modulation.

20. The optical field receiver according to claim 4, wherein the optical field compensation circuit compensates for at least one of a wavelength dispersion characteristic, a high-order wavelength dispersion characteristic, an optical fiber nonlinear effect, and wavelength band limitation of the transmission line, among the propagation characteristics of the transmission line of the optical signal.

\* \* \* \* \*